(12) United States Patent
Harada et al.

(10) Patent No.: US 8,416,512 B2
(45) Date of Patent: Apr. 9, 2013

(54) WIDE-ANGLE LENS, IMAGING OPTICAL APPARATUS AND DIGITAL EQUIPMENT

(75) Inventors: Hiroki Harada, Zushi (JP); Yasushi Yamamoto, Kishiwada (JP)

(73) Assignee: Nikon Corporation, Tokyo (JP)

( * ) Notice: Subject to any disclaimer, the term of this patent is extended or adjusted under 35 U.S.C. 154(b) by 286 days.

(21) Appl. No.: 12/878,292

(22) Filed: Sep. 9, 2010

(65) Prior Publication Data

US 2011/0090574 A1  Apr. 21, 2011

(30) Foreign Application Priority Data

Sep. 9, 2009  (JP) .................................. 2009-207811

(51) Int. Cl.
 *G02B 9/06* (2006.01)

(52) U.S. Cl. ...................................................... 359/794
(58) Field of Classification Search .................. 359/684, 359/691, 794
 See application file for complete search history.

(56) References Cited

U.S. PATENT DOCUMENTS

| | | | |
|---|---|---|---|
| 6,384,986 B1 * | 5/2002 | Nishimura | ..................... 359/692 |
| 7,551,367 B2 | 6/2009 | Harada | |
| 2009/0015938 A1 | 1/2009 | Harada | |

FOREIGN PATENT DOCUMENTS

| | | |
|---|---|---|
| JP | 11-030743 A | 2/1999 |
| JP | 11-030743 A | 2/1999 |
| JP | 2009-020341 A | 1/2009 |
| JP | 2009-020341 A | 1/2009 |
| JP | 2009-058652 A | 3/2009 |
| JP | 2009-058652 A | 3/2009 |

* cited by examiner

*Primary Examiner* — Joseph P Martinez
(74) *Attorney, Agent, or Firm* — Miles & Stockbridge P.C.

(57) ABSTRACT

A wide-angle lens LN consists of, in order from an object side: a first lens group Gr1 having positive refractive power; and a second lens group Gr2 having positive refractive power; the second lens group Gr2 is movable toward the object side with fixing the first lens group Gr1, thereby carrying out focusing on a close object, and a given conditional expression is satisfied. Therefore, a wide-angle lens having high optical performance with suppressing variation in aberrations upon focusing in spite of being a large aperture, an imaging optical apparatus equipped therewith, and a digital equipment are provided.

14 Claims, 25 Drawing Sheets

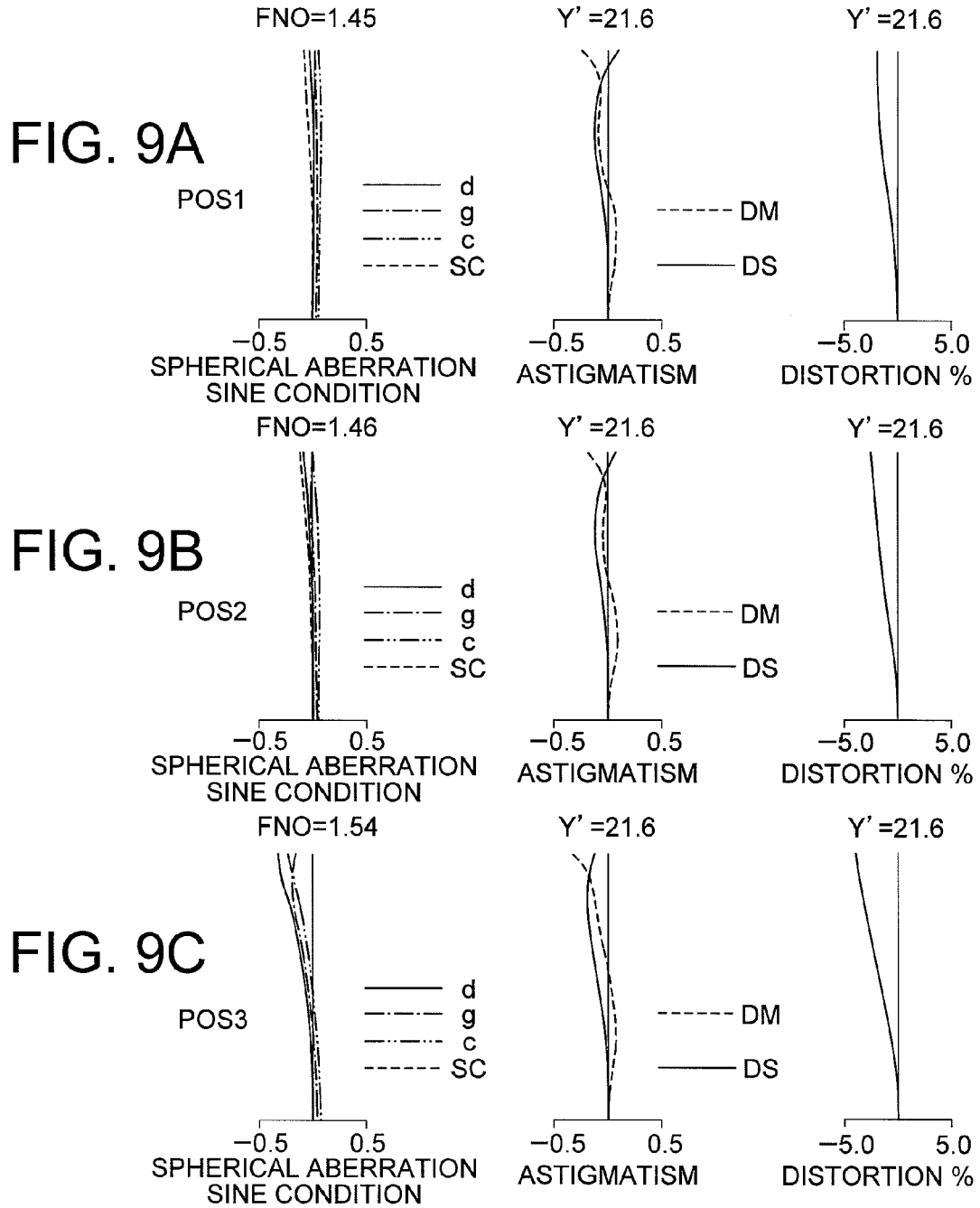

EX1

EX1

EX1

EX1

EX1

EX1

EX1

EX1

EX1

EX1

EX1

EX1

EX1

EX1

EX1

EX1

EX1

EX1

EX1

EX1

EX1

EX1

EX1

EX1

EX1

EX1

EX1

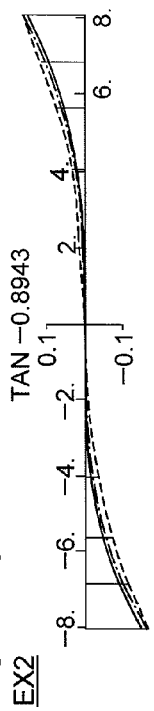
FIG. 16A
EX2
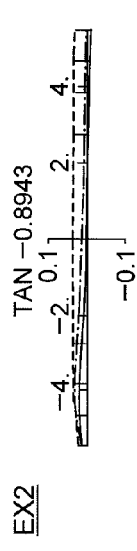
FIG. 16B
EX2
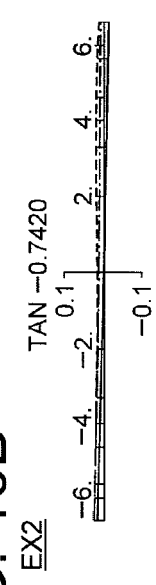
FIG. 16C
EX2
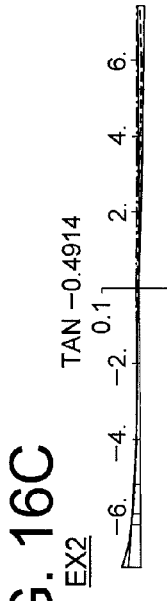
FIG. 16D
EX2
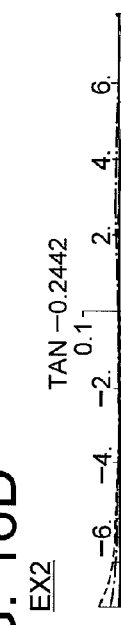
FIG. 16E
EX2
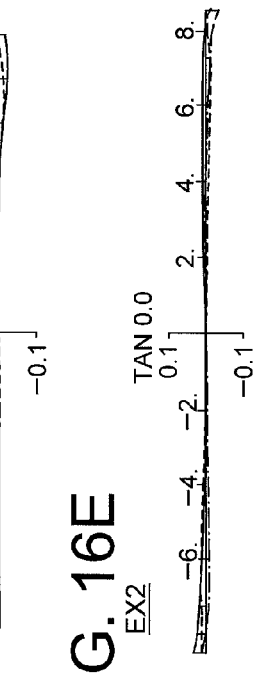
FIG. 16F EX2
FIG. 16G EX2
FIG. 16H EX2
FIG. 16I EX2

EX2

EX2

EX2

EX2

EX2

EX2

EX2

EX2

EX2

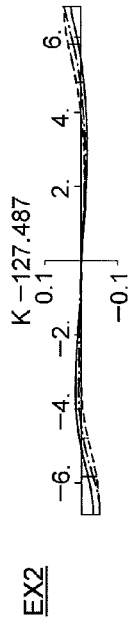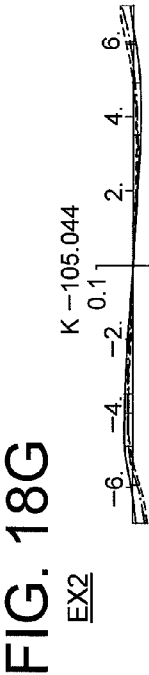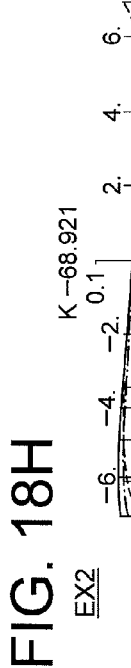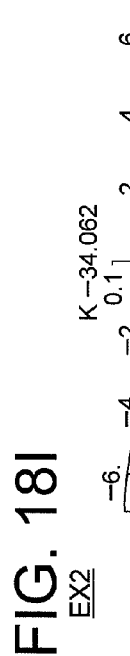
FIG. 18A EX2
FIG. 18B EX2
FIG. 18C EX2
FIG. 18D EX2
FIG. 18E EX2
FIG. 18F EX2
FIG. 18G EX2
FIG. 18H EX2
FIG. 18I EX2

EX3

EX3

EX3

EX3

EX3

EX3

EX3

EX3

EX3

EX3

EX3

EX3

EX3

EX3

EX3

EX3

EX3

EX3

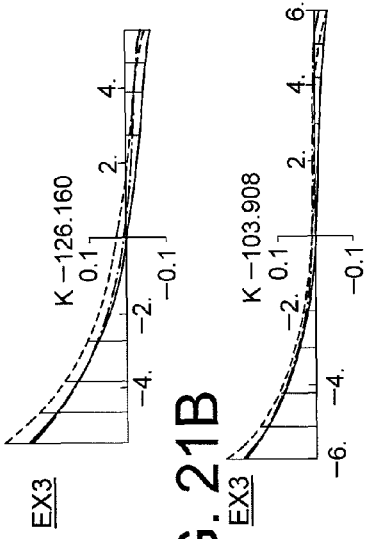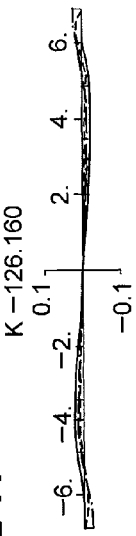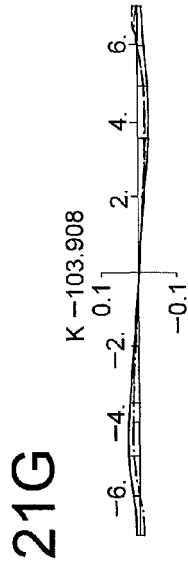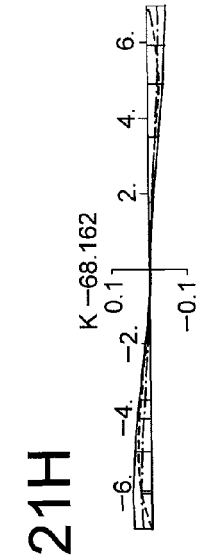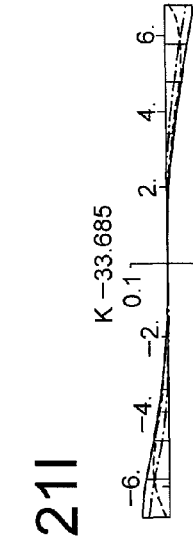
FIG. 21A EX3
FIG. 21B EX3
FIG. 21C EX3
FIG. 21D EX3
FIG. 21E EX3
FIG. 21F EX3
FIG. 21G EX3
FIG. 21H EX3
FIG. 21I EX3

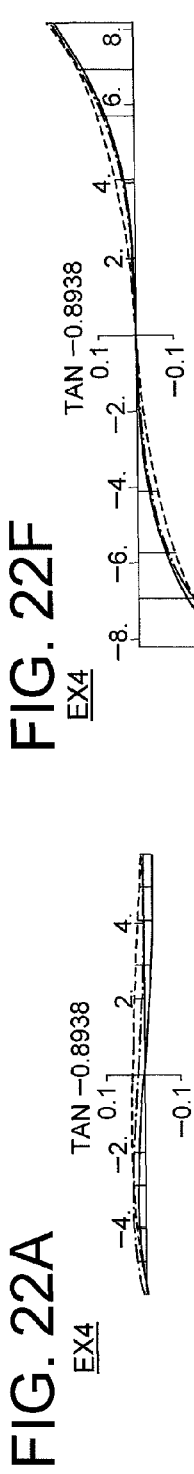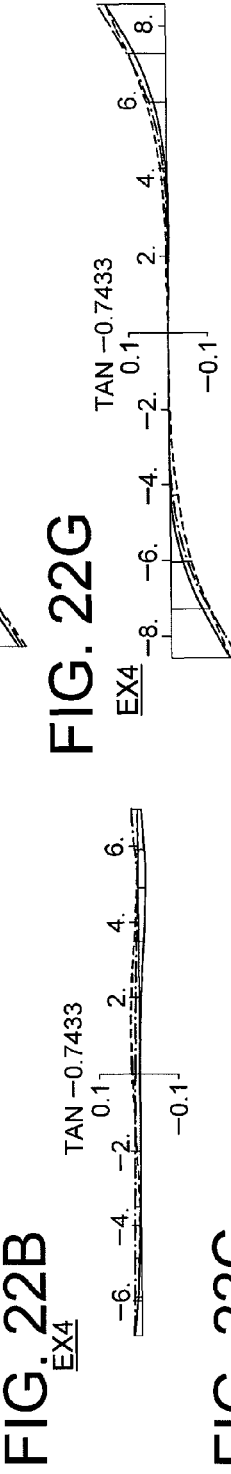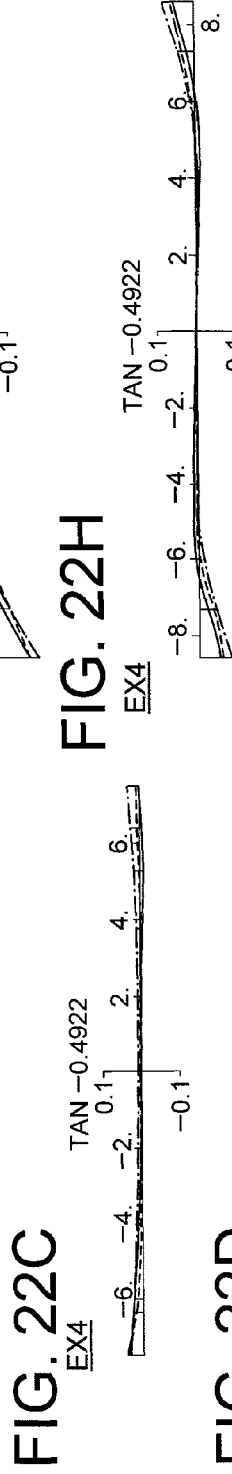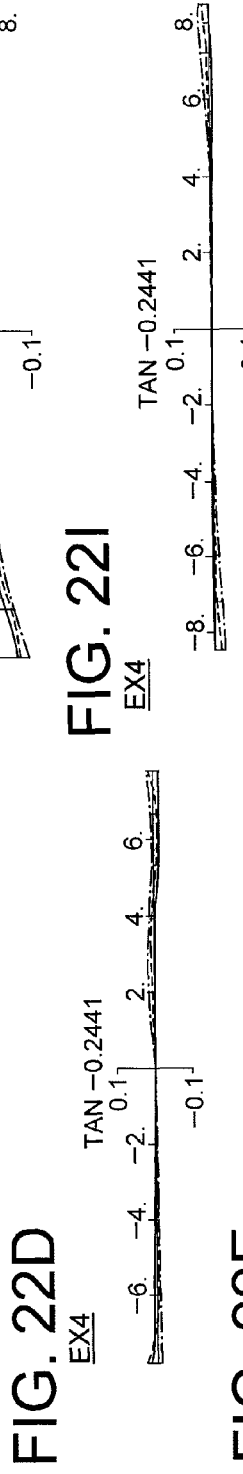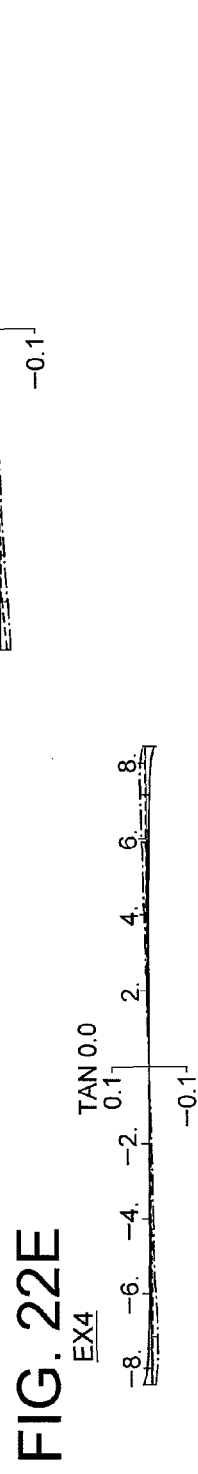

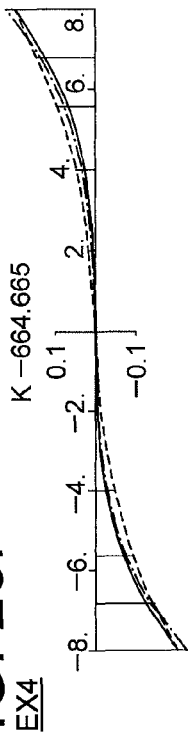
FIG. 23A
EX4
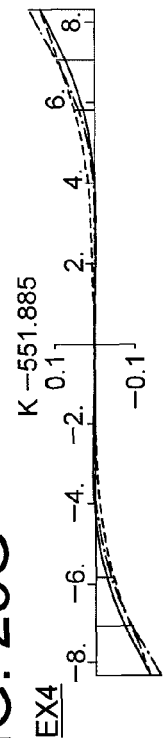
FIG. 23B
EX4
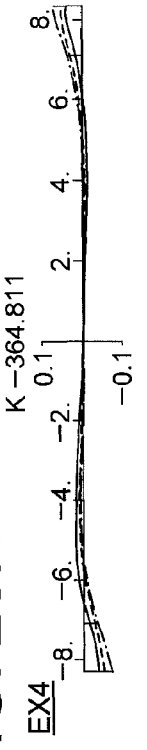
FIG. 23C
EX4
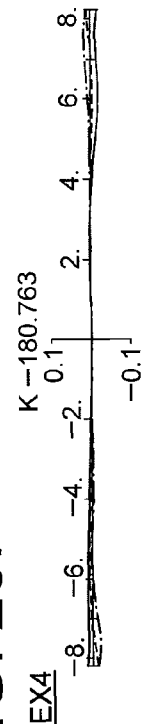
FIG. 23D
EX4
FIG. 23E
EX4
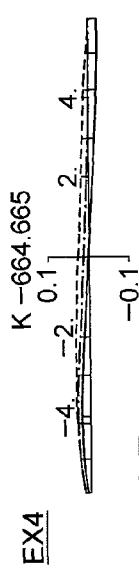
FIG. 23F
EX4
FIG. 23G
EX4
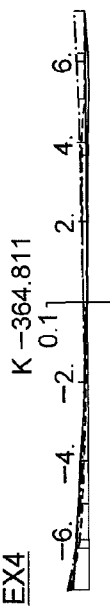
FIG. 23H
EX4
FIG. 23I
EX4
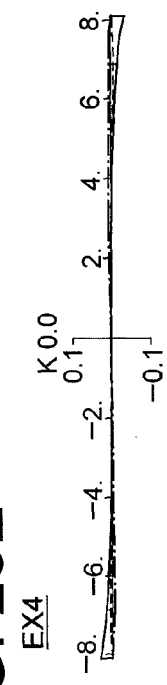

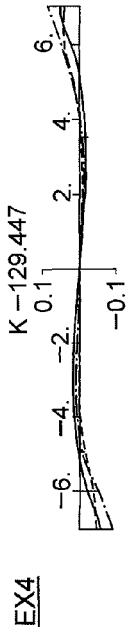
FIG. 24A
EX4
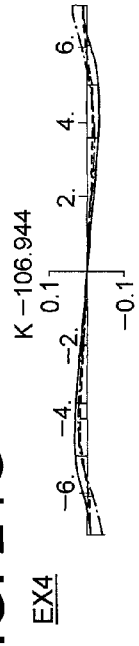
FIG. 24B
EX4
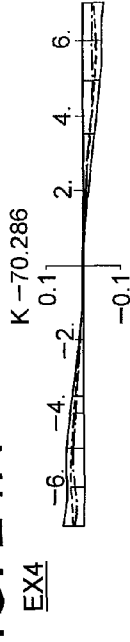
FIG. 24C
EX4
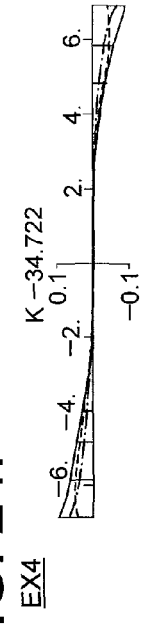
FIG. 24D
EX4
FIG. 24E
EX4
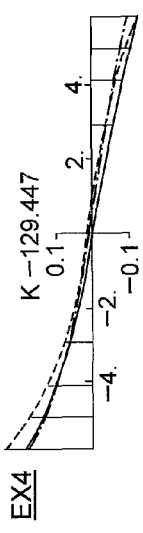
FIG. 24F
EX4
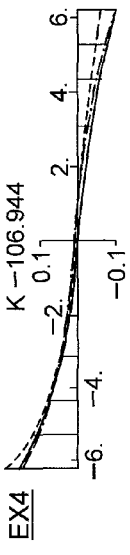
FIG. 24G
EX4
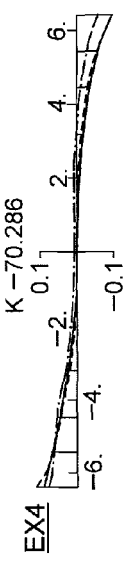
FIG. 24H
EX4
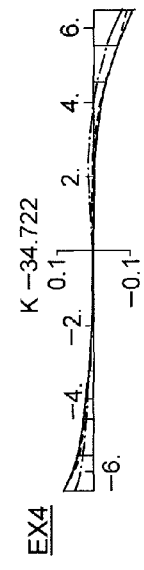
FIG. 24I
EX4
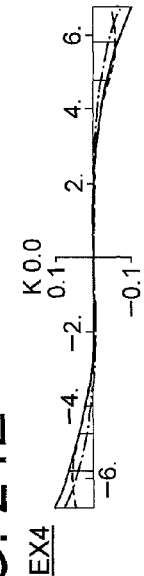

WIDE-ANGLE LENS, IMAGING OPTICAL APPARATUS AND DIGITAL EQUIPMENT

The disclosure of the following priority application is herein incorporated by reference:

Japanese Patent Application No. 2009-207811 filed on Sep. 9, 2009.

BACKGROUND OF THE INVENTION

1. Field of the Invention

The present invention relates to a wide-angle lens, an imaging optical apparatus, and a digital equipment, and in particular to, for example, a wide-angle lens that is used for an interchangeable lens for a single-lens reflex camera and a digital camera and forms an optical image of an object on a silver-halide film or an imaging device (for example, a solid-state image sensor such as a CCD (Charge coupled Device) image sensor, and a CMOS (Complementary Metal-Oxide Semiconductor) image sensor), an imaging optical apparatus that outputs the image of the object captured by the wide-angle lens and the imaging device as an electrical signal, and a digital equipment that is equipped with the imaging optical apparatus having an image input function such as a digital camera.

2. Related Background Art

There have been proposed large aperture (an f-number about 1.4), wide-angle lenses suitable for a camera having a long back focal length (such as a single-lens reflex camera) in such as Japanese Patent Application Laid-Open Nos. 11-30743, 2009-20341, and 2009-58652. The wide-angle lenses proposed in Japanese Patent Application Laid-Open Nos. 11-30743, and 2009-20341 have a negative-positive-positive lens group configuration. The wide-angle lens proposed in Japanese Patent Application Laid-Open No. 2009-58625 has a negative-positive lens group configuration. In a wide-angle lens having a long back focal length, a retrofocus lens type having a preceding negative lens group is common. However, since a retrofocus lens type tends to have unsymmetrical lens power distribution with respect to an aperture stop, variation in optical performance upon focusing becomes large. In order to suppress variation in optical performance upon focusing, a floating method is adopted upon focusing in wide-angle lenses disclosed in Japanese Patent Application Laid-Open Nos. 11-30743, and 2009-20341, and a rear-focusing method is adopted in a wide-angle lens disclosed in Japanese Patent Application Laid-Open No. 2009-58652.

When a floating method as shown in wide-angle lenses disclosed in Japanese Patent Application Laid-Open Nos. 11-30743, and 2009-20341 is adopted, there are fears that the lens barrel construction becomes complicated, and deterioration in optical performance is generated by decentering error upon manufacturing. On the other hand, in a wide-angle lens disclosed in Japanese Patent Application Laid-Open No. 2009-58652, although an f-number of 1.4 is accomplished by a rear-focusing method, improvement of variation in optical performance upon focusing is not sufficient.

A large aperture wide-angle lens having an angle of view $2\omega$ of about 80 to 90 degrees with an f-number of about 1.4 has a problem about correction of aberrations. In other words, when a wide angle of view with a large aperture of an f-number smaller than 1.9 is to be accomplished, correction of sagittal coma generated by a lens surface having strong curvature becomes difficult. When sagittal coma still exists, since MTF (Modulation Transfer Function) in a low spatial frequency range becomes worse, improvement of sagittal coma is expected to a wide-angle lens having an f-number of less than 1.9.

SUMMARY OF THE INVENTION

The present invention is made in view of the above described problem, and has an object to provide a wide-angle lens having high optical performance with suppressing variation in aberrations upon focusing in spite of having a large aperture, and an imaging optical apparatus, and a digital equipment equipped therewith.

According to a first aspect of the present invention, there is provided a wide-angle lens consisting of, in order from an object side: a first lens group having positive refractive power; and a second lens group having positive refractive power; the second lens group being movable toward the object side with fixing the first lens group, thereby carrying out focusing on a close object, and the following conditional expression (1) being satisfied:

$$10 < f1/fL < 150 \qquad (1)$$

where f1 denotes a focal length of the first lens group, and fL denotes a focal length of the wide-angle lens.

In the first aspect of the present invention, it is preferable that the first lens group includes, in order from the object side, a first lens having negative refractive power with a concave surface facing an image side, a second lens having negative refractive power with a concave surface facing the image side, and at least one lens component having positive refractive power with a convex surface facing the object side disposed to the image side of the second lens, and one lens component having shorter focal length among said at least one lens component satisfies the following conditional expression (2):

$$0.6 < T/fL < 1.25 \qquad (2)$$

where T denotes a distance from a vertex of an image side surface of the second lens to a vertex of an object side surface of the lens component having positive refractive power with a convex surface facing the object side.

In the first aspect of the present invention, it is preferable that the first lens group includes at least one negative lens, and the negative lens in the first lens group includes at least one aspherical surface.

In the first aspect of the present invention, it is preferable that the first lens group includes, in order from the object side, a first lens having negative refractive power with a concave surface facing an image side, and a second lens having negative refractive power with a concave surface facing an image side, and the aspherical surface is formed on the image side surface of the second lens.

In the first aspect of the present invention, it is preferable that the second lens group consists of, in order from the object side, a front lens group having positive refractive power, an aperture stop, and a rear lens group having positive refractive power, and the most object side lens in the front lens group is a negative lens.

In the first aspect of the present invention, it is preferable that the most object side lens in the front lens group satisfies the following conditional expression (3):

$$-4 < f21/fL < -2.5 \qquad (3)$$

where f21 denotes a focal length of the most object side lens in the front lens group.

In the first aspect of the present invention, it is preferable that the rear lens group consists of three lens blocks which are, in order from the object side, a first lens block having negative refractive power, a second lens block having positive refractive power, and a third lens block having positive refractive power, and the second lens block satisfies the following conditional expression (4):

$$65 < \nu d2 \quad (4)$$

where $\nu d2$ denotes an Abbe number of the second lens block or an Abbe number of a positive lens composing the second lens block when the second lens block is a cemented lens.

In the first aspect of the present invention, it is preferable that the rear lens group consists of three lens blocks which are, in order from the object side, a first lens block having negative refractive power, a second lens block having positive refractive power, and a third lens block having positive refractive power, and at least one aspherical surface is formed on the image side surface of the first lens block.

In the first aspect of the present invention, it is preferable that the first lens group consists of, in order from the object side, a first lens having negative refractive power, a second lens group having negative refractive power, a third lens having a concave surface facing the object side, and a fourth lens having positive refractive power, and the following conditional expression (5) is satisfied:

$$0.1 < T13/fL < 0.25 \quad (5)$$

where T13 denotes a thickness of the third lens in the first lens group.

In the first aspect of the present invention, it is preferable that the following conditional expression (6) is satisfied:

$$-0.03 < fL/f13 < 0.02 \quad (6)$$

where f13 denotes a focal length of the third lens in the first lens group.

In the first aspect of the present invention, it is preferable that the following conditional expression (7) is satisfied:

$$0.5 < fL/f2 < 0.65 \quad (7)$$

where f2 denotes a focal length of the second lens group.

In the first aspect of the present invention, it is preferable that an f-number of the wide-angle lens is 1.9 or less.

According to a second aspect of the present invention, there is provided an imaging optical apparatus comprising: a wide-angle lens according to the first aspect; and an imaging device for converting an optical image formed on a detecting surface into an electrical signal, wherein the wide-angle lens is disposed in such a manner that an optical image of an object is formed on the detecting surface of the imaging device.

According to a third aspect of the present invention, there is provided a digital equipment added at least one function among taking a still picture and shooting movie of an object by installing an imaging optical apparatus according to the second aspect.

With adopting the construction according to the present invention, it becomes possible to realize a wide-angle lens having high optical performance with suppressing variation in aberrations upon focusing in spite of having a large aperture, and an imaging optical apparatus equipped therewith. With adopting the imaging optical apparatus according to the present invention to a digital equipment such as a digital camera, it becomes possible to add a high quality image input function compactly to a digital equipment.

BRIEF DESCRIPTION OF THE DRAWINGS

FIGS. 9A, 9B, and 9C show various longitudinal aberrations of the wide-angle lens according to Example 1, in which FIG. 9A is a focus position 1, FIG. 9B is a focus position 2, and FIG. 9C is a focus position 3.

FIGS. 10A, 10B, and 10O show various longitudinal aberrations of the wide-angle lens according to Example 2, in which FIG. 10A is a focus position 1, FIG. 10B is a focus position 2.

FIGS. 11A, 11B, and 11C show various longitudinal aberrations of the wide-angle lens according to Example 3, in which FIG. 11A is a focus position 1, FIG. 11B is a focus position 2, and FIG. 11C is a focus position 3.

FIGS. 12A, 12B, and 12C show various longitudinal aberrations of the wide-angle lens according to Example 4, in which FIG. 12A is a focus position 1, FIG. 12B is a focus position 2, and FIG. 12C is a focus position 3.

FIGS. 16A through 16I show transversal aberration of the wide-angle lens according to Example 2 at the focus position 1.

FIGS. 18A through 18I show transversal aberration of the wide-angle lens according to Example 2 at the focus position 3.

FIGS. 21A through 21I show transversal aberration of the wide-angle lens according to Example 3 at the focus position 3.

FIGS. 22A through 22I show transversal aberration of the wide-angle lens according to Example 4 at the focus position 1.

FIGS. 23A through 23I show transversal aberration of the wide-angle lens according to Example 4 at the focus position 2.

FIGS. 24A through 24I show transversal aberration of the wide-angle lens according to Example 4 at the focus position 3.

DESCRIPTION OF THE MOST PREFERRED EMBODIMENT

Figure 1:
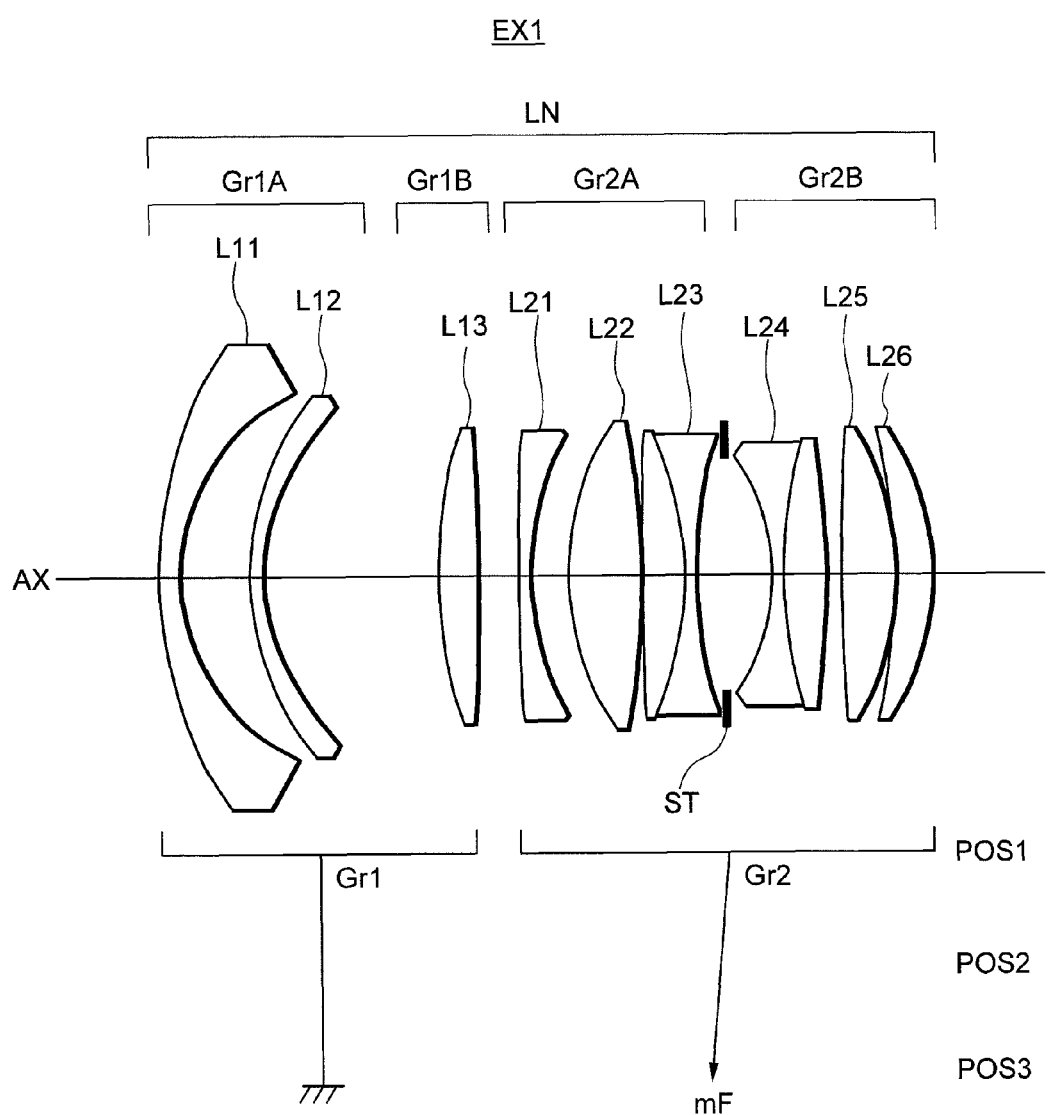
FIG. 1 is a sectional view showing a lens configuration of a wide-angle lens according to a first embodiment (Example 1).

A wide-angle lens, an imaging optical apparatus and a digital equipment according to the present invention are explained below. The wide-angle lens according to the present invention consists of, in order from an object side, a first lens group having positive refractive power, and a second lens group having positive refractive power, and the second lens group is movable to the object side with fixing the first lens group thereby carrying out focusing from a distant object to a close object. The following conditional expression (1) is satisfied:

$$10 < f1/fL < 150 \quad (1)$$

where f1 denotes a focal length of the first lens group, and fL denotes a focal length of the wide-angle lens.

In a large aperture imaging optical system, how to carry out correction of aberrations becomes an optical problem. Correction of aberrations upon focusing is the similar issue, so that it becomes difficult to suppress variation in optical performance upon focusing in comparison with an imaging optical system having an ordinal aperture. In an imaging optical system such as an interchangeable lens for a single-lens reflex camera and an imaging lens for a digital camera, it becomes common to electrically drive a focusing system by a motor, so that it is desired to reduce a moving amount and weight of a focusing group in order to reduce burden on the motor. In order to solve the problem, the wide-angle lens according to the resent invention adopts a so-called rear-focusing configuration in which the first lens group is fixed, and the second lens group is moved to the object side upon focusing. With adopting the rear-focusing configuration, it becomes possible to simplify a lens barrel construction and to reduce weight. Moreover, with making the first lens group substantially afocal, it becomes possible to suppress variation in aberration in the second lens group upon focusing.

Conditional expression (1) defines an appropriate range of optical power of the first lens group. When the ratio f1/fL is equal to or exceeds the upper limit of conditional expression (1), negative power in the first lens group becomes excessively strong, so that it becomes difficult to correct distortion and coma. On the other hand, when the ratio f1/fL is equal to or falls below the lower limit of conditional expression (1), substantially afocal construction cannot be taken, so that variations in spherical aberration and coma upon focusing become large.

With using the above-described distinctive configuration, it becomes possible to realize a wide-angle lens having high optical performance with suppressing variation in aberrations upon focusing in comparison with a conventional type in spite of having a large aperture, and an imaging optical apparatus equipped therewith. Since lens barrel construction of the imaging optical apparatus can be simplified and reduced weight, when the imaging optical apparatus is used in a digital equipment such as a digital camera, a handheld terminal, and the like, a high-performance-image-input function can be added to the digital equipment with a lightweight and compact manner. Accordingly, it becomes possible to contribute for making the digital equipment compact, high performance and high function. Conditions for realizing further high optical performance and compactness with obtaining such effects in a balanced manner are explained below.

The following conditional expression (1a) is preferably satisfied, and the following conditional expression (1b) is further preferably satisfied:

$$10 < f1/fL < 50 \quad (1a)$$

$$13 < f1/fL < 20 \quad (1b).$$

These conditional expressions (1a) and (1b) define further preferable range based on the above-described point of view among the preferable range defined by conditional expression (1). Accordingly, with preferably satisfying conditional expression (1a), with further preferably satisfying conditional expression (1b), the above-described effect can further be secured.

An f-number is preferably smaller than 1.9. In other words, in a large aperture wide-angle lens with an f-number of less than 1.9, conditional expressions (1) and the like are preferably satisfied. When a wide-angle lens is made to have a large aperture with an f-number of less than 1.9, it becomes difficult to correct sagittal coma, which is transversal aberration, generated on a strongly curved lens surface. When sagittal coma is remained, MTF (Modulation Transfer Function) in lower spatial frequency range becomes worse. In order to correct this, the number of lenses composing the lens inevitably becomes large. Accordingly, the number of lenses composing a lens system varies largely between one having an f-number of less than 1.9 and one having an f-number of larger than 1.9. Accordingly, conditional expressions (1) and the like have significant meaning on correction of aberrations to a large aperture wide-angle lens having an f-number of less than 1.9.

The first lens group includes, in order from the object side, a first lens having negative power with a concave surface facing an image side, a second lens having negative power with a concave surface facing the image side, and at least one lens component having positive power with a convex surface facing the object side disposed to the image side of the second lens, and the lens component having shorter focal length satisfies the following conditional expression (2):

$$0.6 < T/fL < 1.25 \quad (2)$$

where T denotes a distance between a vertex of the image side surface of the second lens and a vertex of an object side surface of the lens component having positive power with a convex surface facing the object side.

As described above, since the first lens group has a substantially afocal construction, the first lens group can be considered as a wide-converter with the second lens group as a master lens. When the first lens group is considered as a wide-converter lens, construction of a wide-converter lens can be composed of the negative lens group disposed to the object side and the positive lens group disposed to the image side. Although converter magnification is determined by power of each lens group and distance between lens groups, when power of each lens group becomes too strong, it becomes difficult to correct aberrations. Then, with satisfying conditional expression (2), the distance T from the first lens and the second lens, which correspond to the negative lens group in the first lens group, to the lens component (when there are two or more lens components, a one having a shorter focal length) having positive power with a convex surface facing the object side is made longer as much as possible to secure the converter magnification so as not to make negative power too strong.

When the ratio T/fL is equal to or exceeds the upper limit of conditional expression (2), the distance T becomes too long, so that the wide-angle lens becomes large. When the enlarged amount of the first lens group is tried to be absorbed by the second lens group, power on the lens surfaces in the second lens group becomes large resulting in deterioration in sagittal coma. On the other hand, when the ratio T/fL is equal to or falls below the lower limit of conditional expression (2), the distance T becomes short, and power of negative lens becomes too strong, so that distortion and coma are largely generated.

The following conditional expression (2a) is preferably satisfied:

$$0.9 < T/fL < 1.0 \tag{2a}$$

Conditional expression (2a) defines further preferable range based on the above-described point of view among the preferable range defined by conditional expression (2). Accordingly, with preferably satisfying conditional expression (2a), the above-described effect can further be secured.

The first lens group preferably includes at least one negative lens, and at least one aspherical surface is preferably included in the negative lens in the first lens group. Since the negative lens in the first lens group generates strong distortion, an aspherical surface for correcting the aberration is preferably included.

The first lens group includes, in order from the object side, the first lens having negative power with a concave surface facing the image side, the second lens having negative power with a concave surface facing the image side, and an aspherical surface is preferably formed on the image side surface of the second lens. As for a preferable arrangement of an aspherical surface upon correction of aberrations, the image side surface of the second lens in the first lens group is to be mentioned. For example, with arranging an aspherical surface in which negative power becomes weaker at the periphery thereof, it becomes possible to effectively correct distortion. Even when an aspherical surface is arranged on the first lens, distortion can be effectively corrected. However, since an outer diameter of the lens becomes large, it is difficult to manufacture the lens.

It is preferable that the second lens group consists of, in order from the object side, a front lens group having positive refractive power, an aperture stop, and a rear lens group having positive refractive power, and the most object side lens in the front lens group is a negative lens. When the first lens group is considered as a wide-converter, the second lens group has a master lens configuration. Accordingly, with constructing the second lens group by, in order from the object side, the front lens group having positive refractive power, the aperture stop, and the rear lens group having positive refractive power, the second lens group becomes a symmetrical imaging optical system, so that it becomes possible to excellently correct aberrations. Although a completely symmetrical imaging optical system is advantageous for correcting aberrations, it is preferable that the most object side lens in the front lens group has negative refractive power in order to secure a back focal length.

The most object side lens in the front lens group in the second lens group preferably satisfies the following conditional expression (3):

$$-4 < f21/fL < -2.5 \tag{3}$$

where f21 denotes a focal length of the most object side lens in the front lens group.

When the ratio f21/fL is equal to or exceeds the upper limit of conditional expression (3), negative power of the most object side lens in the front lens group becomes excessively strong and symmetry of the second lens group becomes broken, so that it becomes difficult to correct spherical aberration and coma. On the other hand, when the ratio f21/fL is equal to or falls below the lower limit of conditional expression (3), negative power of the most object side lens in the front lens group becomes excessively weak, so that it becomes difficult to secure the back focal length. In order to secure the back focal length, it is necessary to weaken power of the positive lens in the front lens group in the second lens group. When the power is weakened, it becomes difficult to correct Petzval sum.

It is preferable that the rear lens group in the second lens group consists of three lens blocks which are, in order from the object side, a first lens block having negative refractive power, a second lens block having positive refractive power, and a third lens block having positive refractive power, and the second lens block satisfies the following conditional expression (4):

$$65 < \upsilon d2 \tag{4}$$

where υd2 denotes an Abbe number of the second lens block (an Abbe number of a positive lens composing the second lens block when the second lens block is a cemented lens).

In a large aperture imaging optical system, an excellent correction is also required for chromatic aberration. In a recent imaging optical system for a digital camera in particular, reduction in chromatic aberration has been required. Since the second lens block in the rear lens group in the second lens group has strong power, generation of chromatic aberration has to be suppressed. Conditional expression (4) defines the above-described condition. With satisfying conditional expression (4), it becomes possible to suppress generation of longitudinal and lateral chromatic aberrations.

It is preferable that the rear lens group in the second lens group consists of three lens blocks which are, in order from the object side, the first lens block having negative refractive power, the second lens block having positive refractive power, and a third lens block having positive refractive power, and at least one aspherical surface is formed on the image side surface of the first lens block (regardless of cemented lens, including a case of a single lens). In a large aperture lens, it is difficult to correct coma, and, in particular, sagittal coma. When the rear lens group in the second lens group consists of three lens blocks of negative-positive-positive, strong coma is generated particularly on the concave surface of the object side of the first lens block having negative refractive power. With providing an aspherical surface on the image side surface thereof, it becomes possible to effectively suppress coma. For example, with providing an aspherical surface having positive power getting weaker to the periphery, it becomes possible to effectively correct sagittal coma.

It is preferable that the first lens group consists of, in order from the object side, a first lens having negative refractive power, a second lens having negative refractive power, a third lens having a concave surface facing the object side, and a fourth lens having positive refractive power, and the following conditional expression (5) is satisfied:

$$0.1 < T13/fL < 0.25 \tag{5}$$

where T13 denotes a thickness of the third lens in the first lens group.

Figure 2:
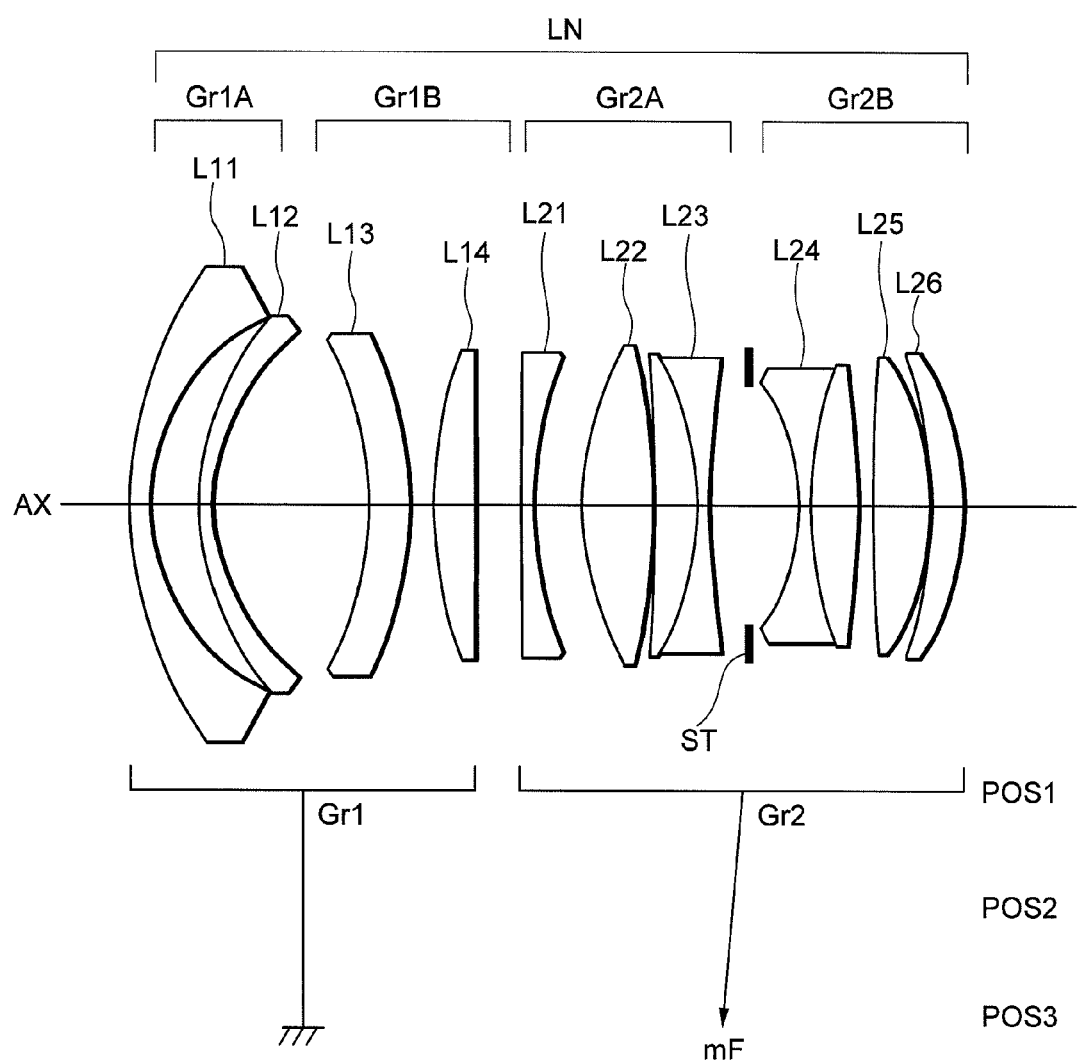
FIG. 2 is a sectional view showing a lens configuration of a wide-angle lens according to a second embodiment (Example 2).
Figure 3:
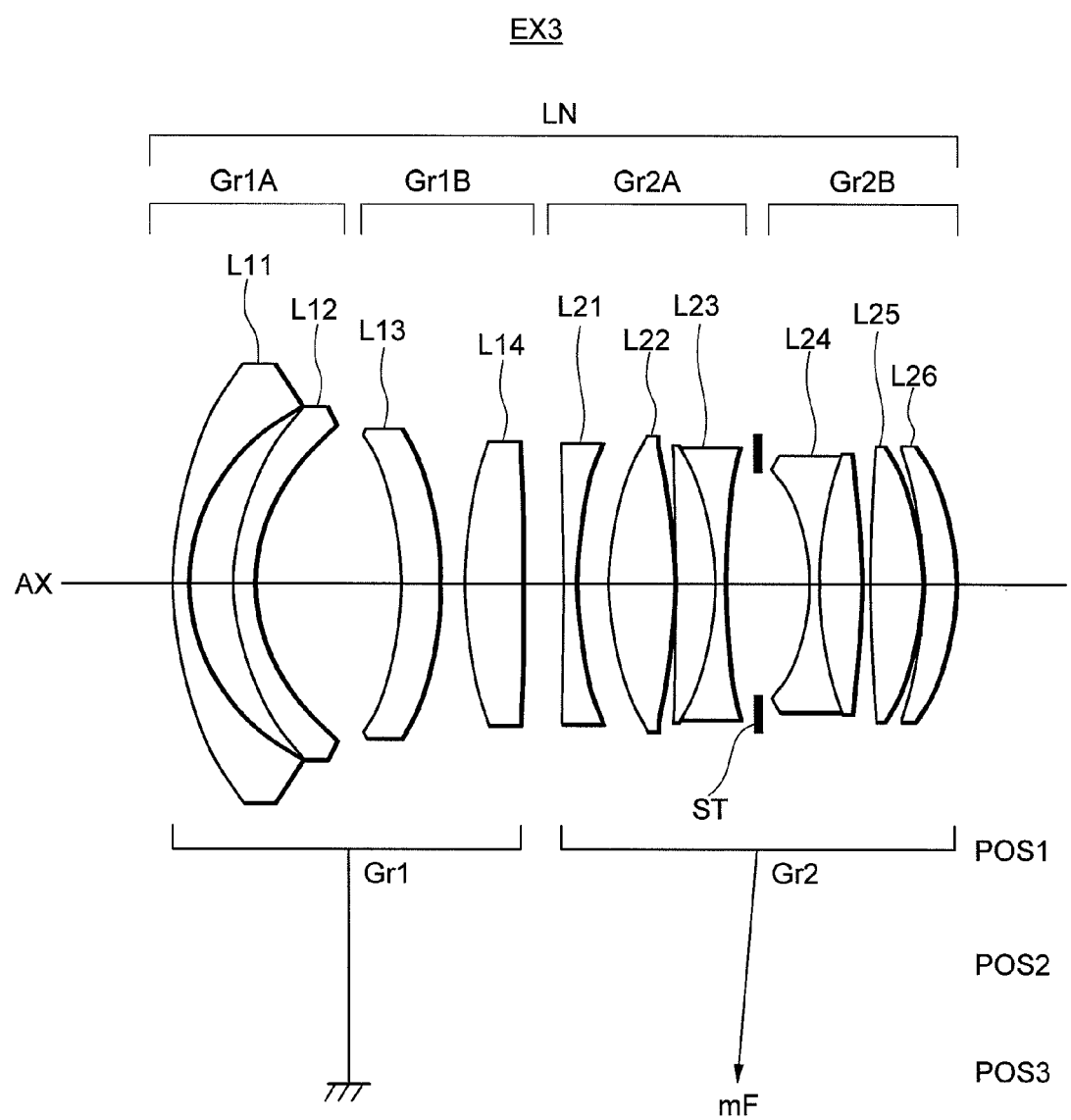
FIG. 3 is a sectional view showing a lens configuration of a wide-angle lens according to a third embodiment (Example 3).
Figure 4:
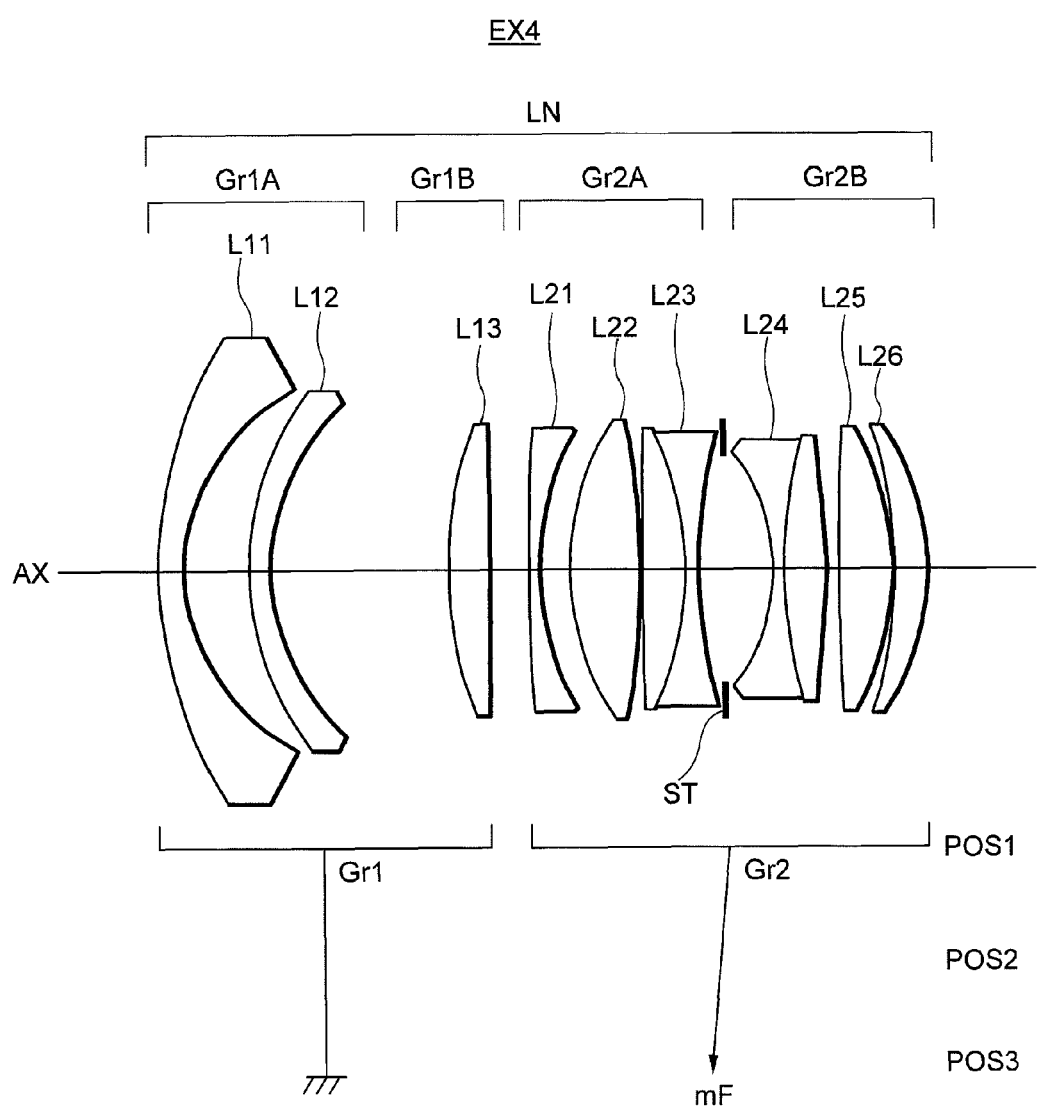
FIG. 4 is a sectional view showing a lens configuration of a wide-angle lens according to a fourth embodiment (Example 4).
Figure 5:
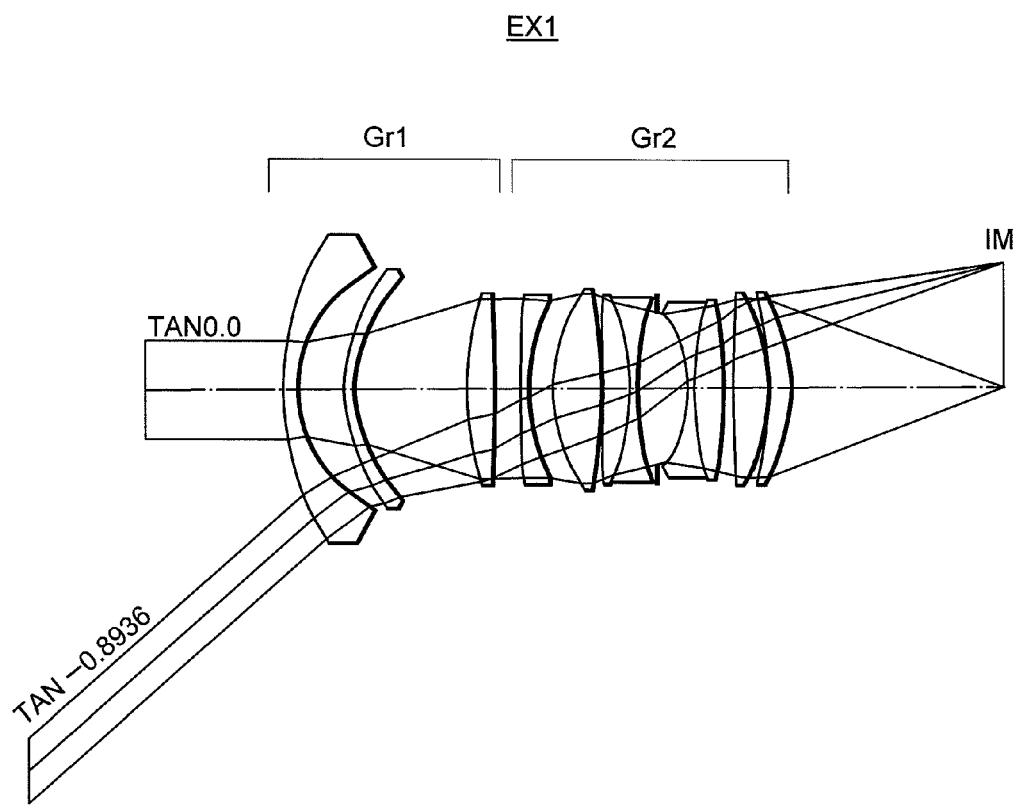
FIG. 5 shows optical paths of the wide-angle lens according to the first embodiment (Example 1).
Figure 6:
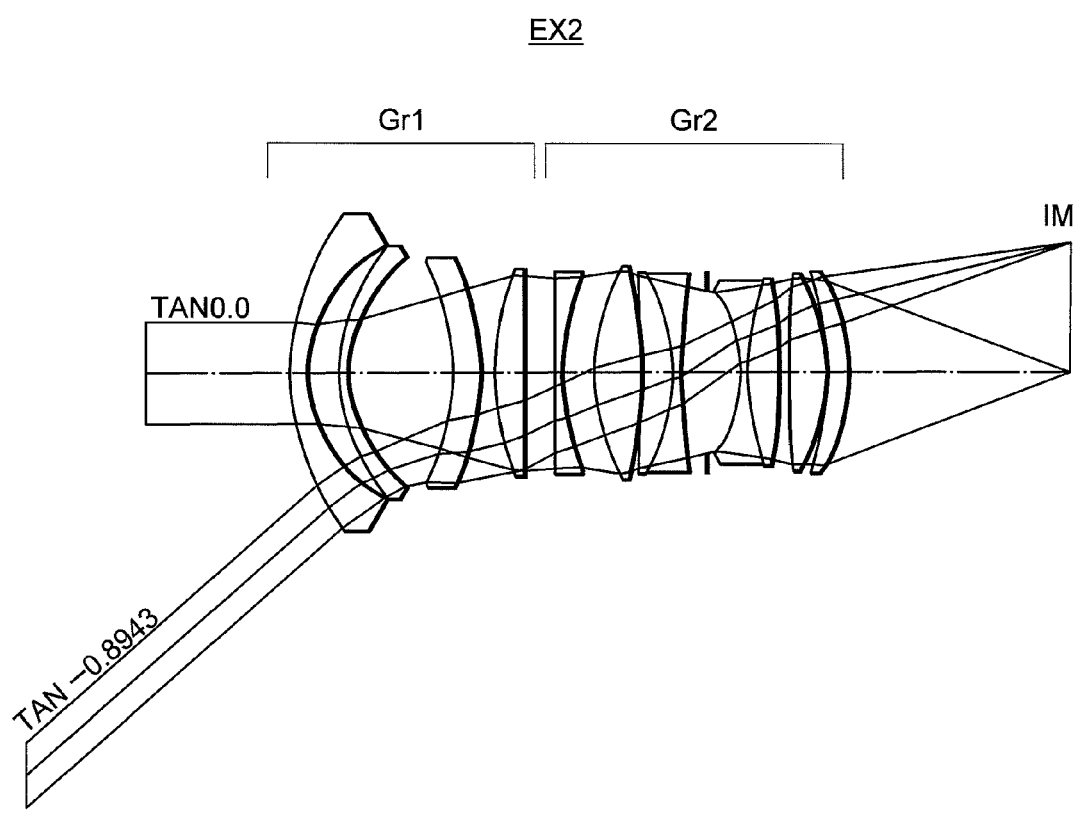
FIG. 6 shows optical paths of the wide-angle lens according to the second embodiment (Example 2).
Figure 7:
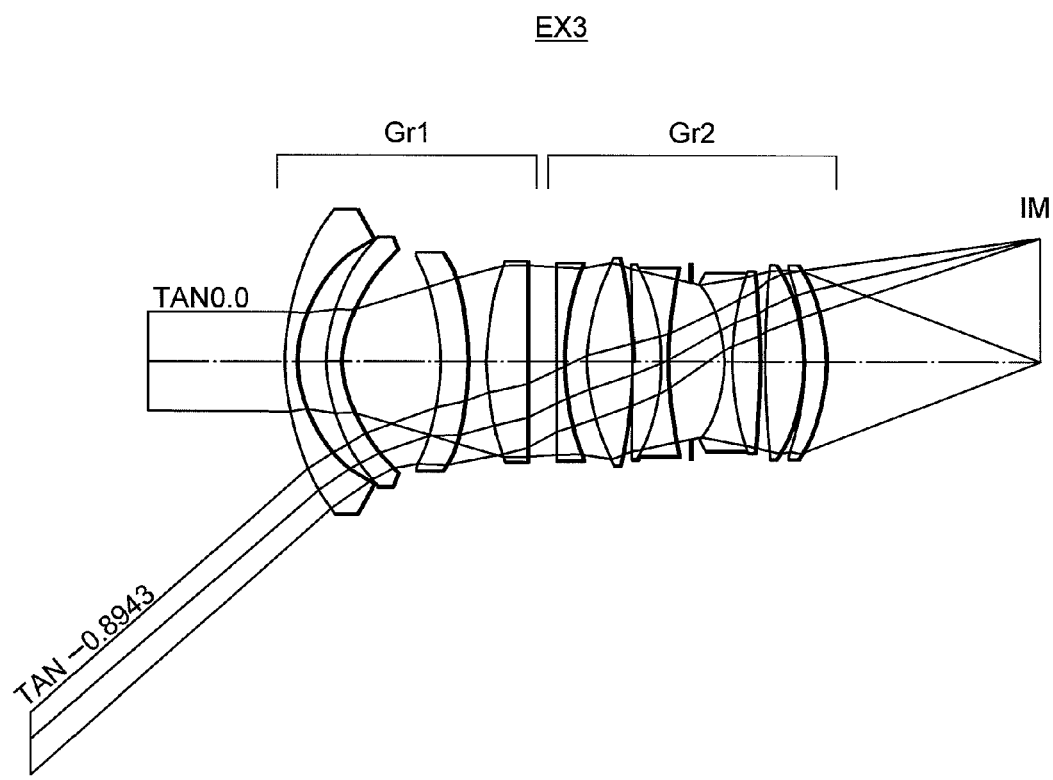
FIG. 7 shows optical paths of the wide-angle lens according to the third embodiment (Example 3).
Figure 8:
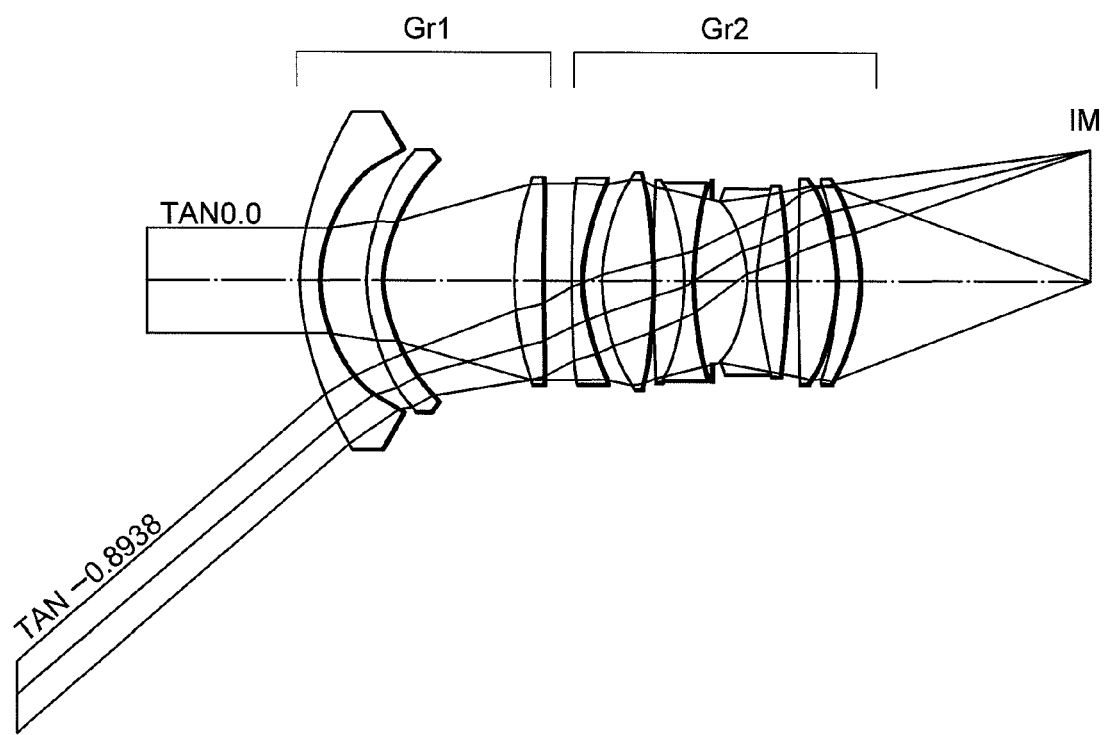
FIG. 8 shows optical paths of the wide-angle lens according to the fourth embodiment (Example 4).
Figure 10A:
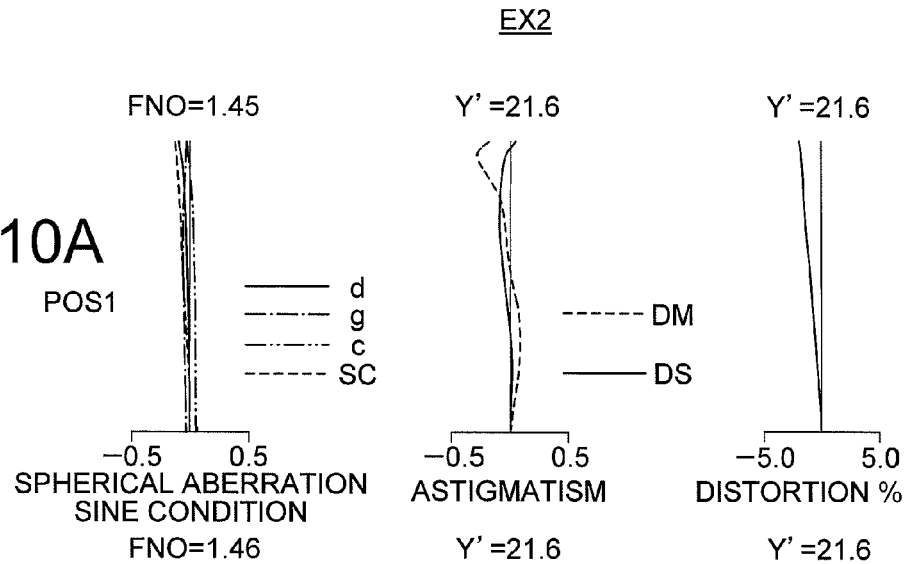
Figure 10B:
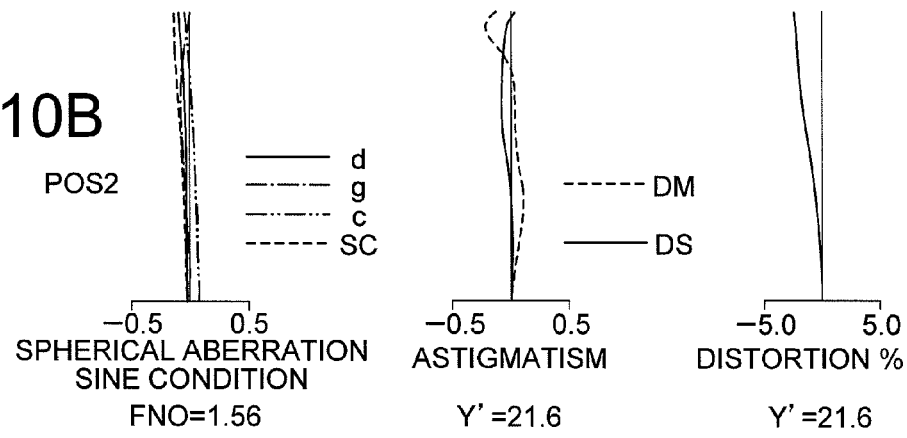
Figure 10C:
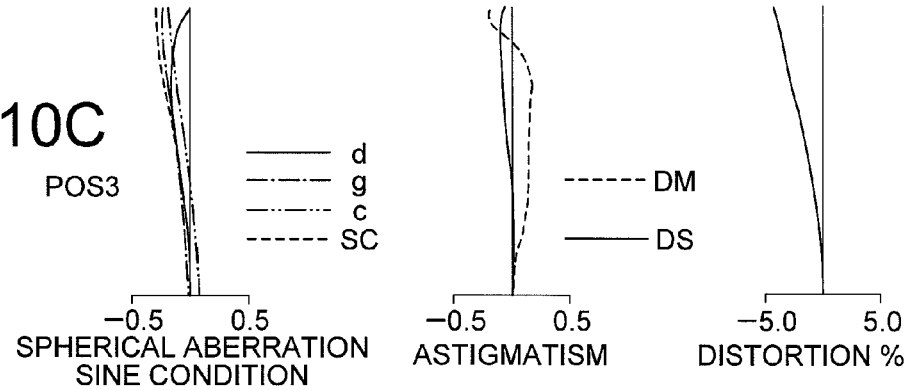
FIG. 10C is a focus position 3.
Figure 11A:
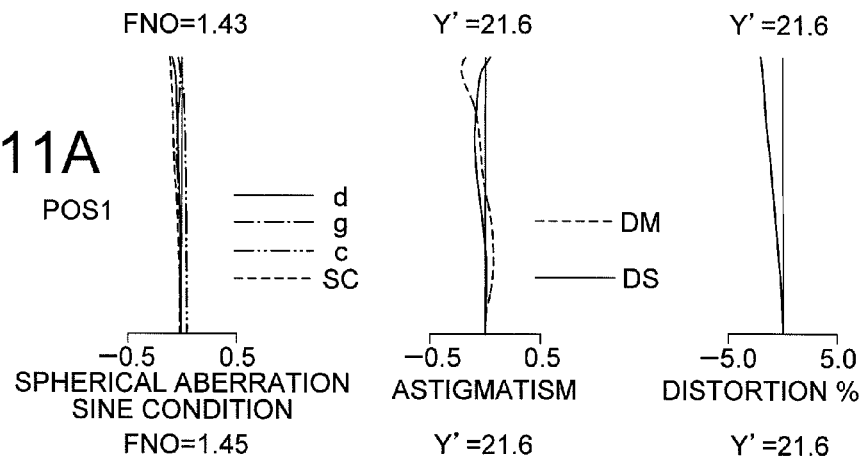
Figure 11B:
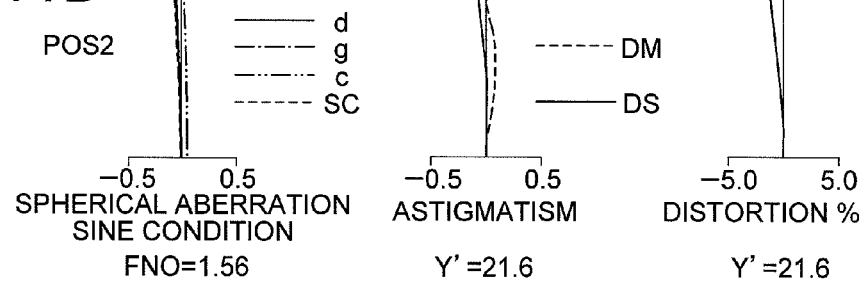
Figure 11C:
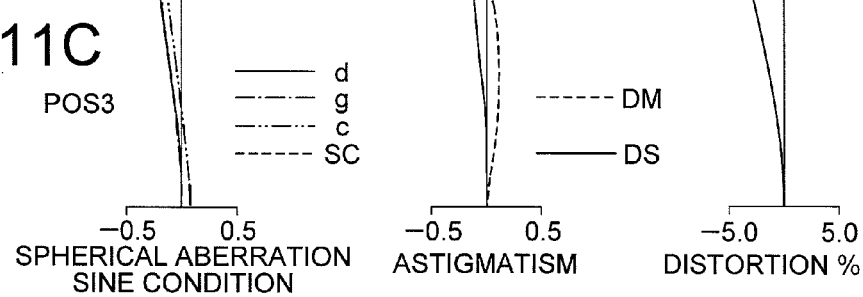
Figure 12A:
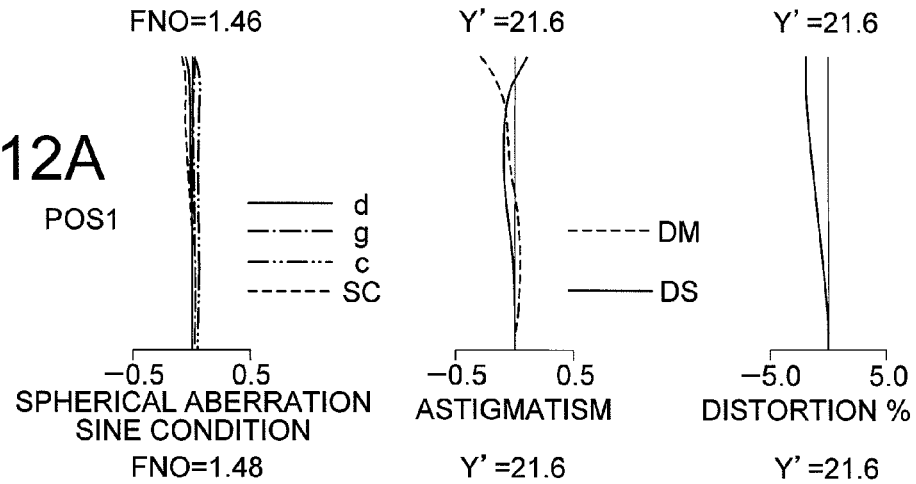
Figure 12B:
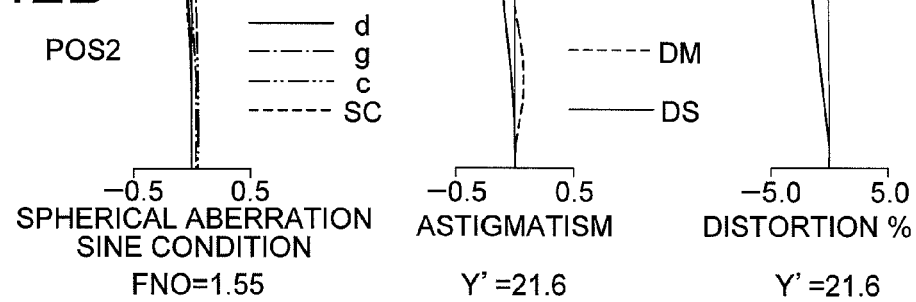
Figure 12C:
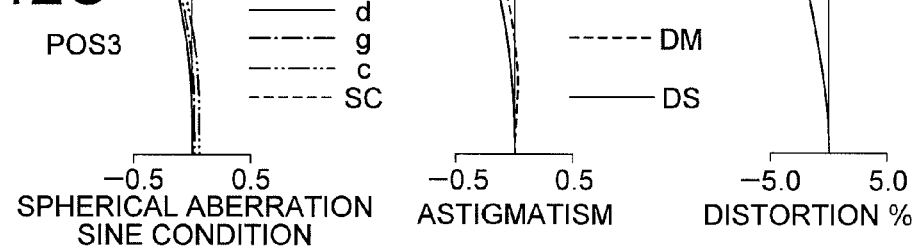
Figure 13A:
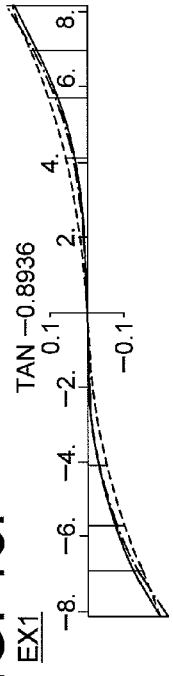
FIGS. 13A through 13I show transversal aberration of the wide-angle lens according to Example 1 at the focus position 1.
Figure 13B:
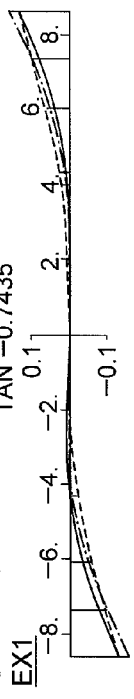
Figure 13C:
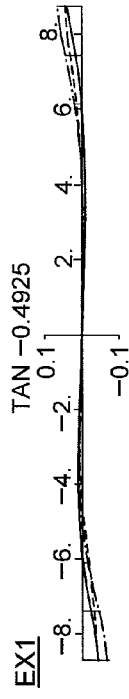
Figure 13D:
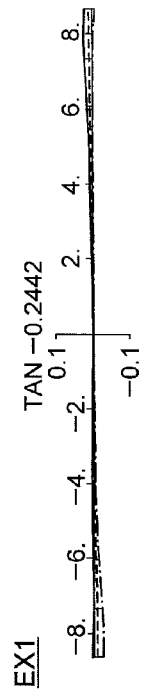
Figure 13E:
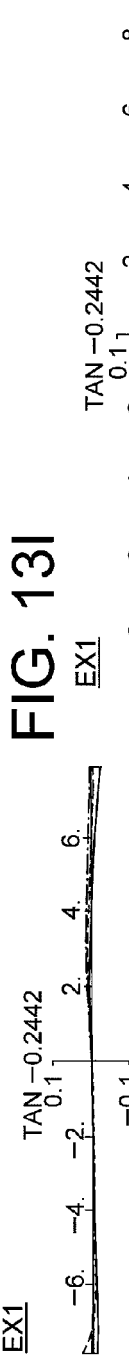
Figure 13F:
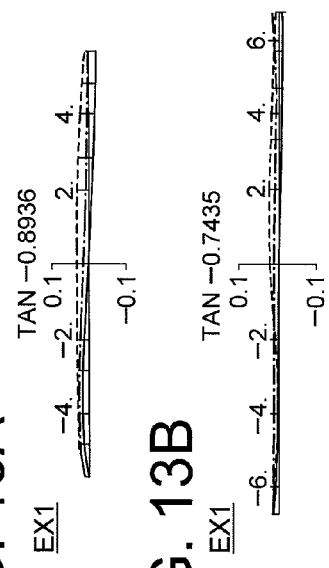
Figure 13G:
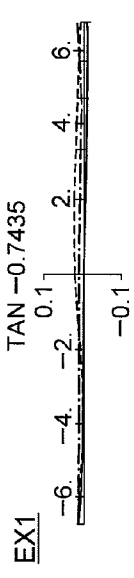
Figure 13H:
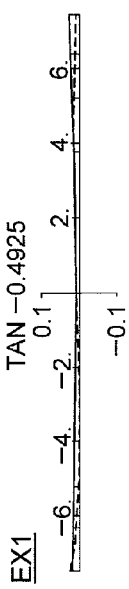
Figure 13I:
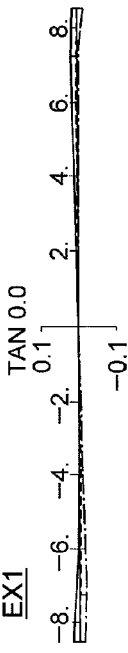
Figure 14A:
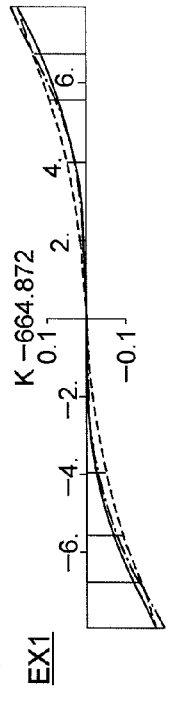
FIGS. 14A through 14I show transversal aberration of the wide-angle lens according to Example 1 at the focus position 2.
Figure 14B:
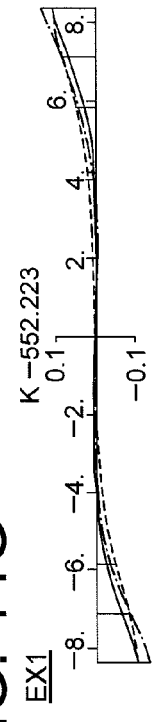
Figure 14C:
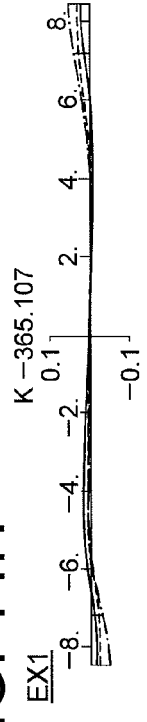
Figure 14D:
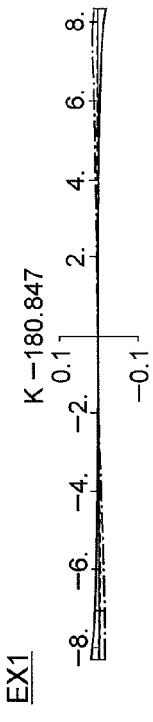
Figure 14E:
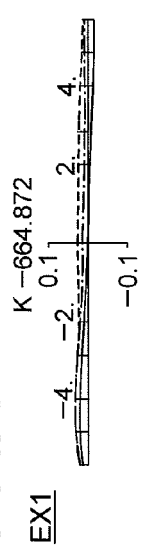
Figure 14F:
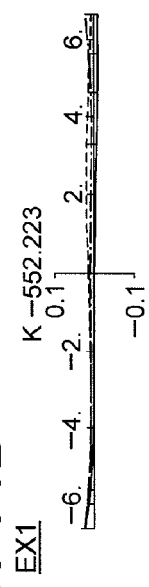
Figure 14G:
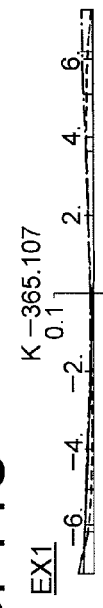
Figure 14H:
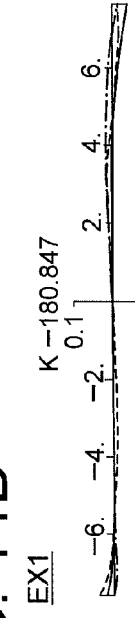
Figure 14I:
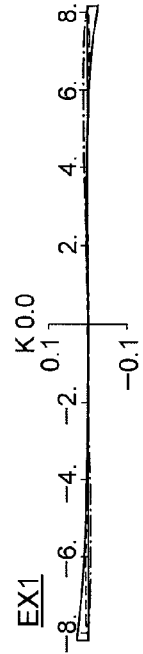
Figure 15A:
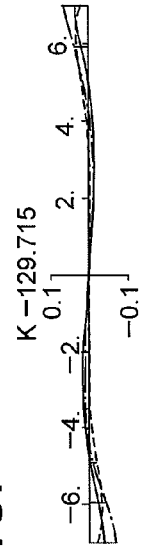
FIGS. 15A through 15I show transversal aberration of the wide-angle lens according to Example 1 at the focus position 3.
Figure 15B:
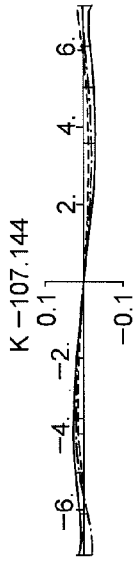
Figure 15C:
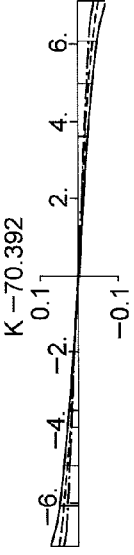
Figure 15D:
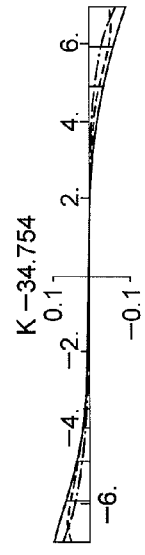
Figure 15E:
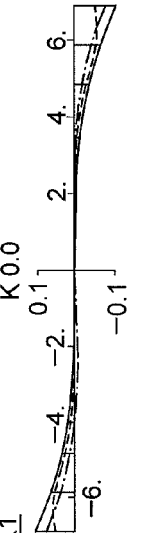
Figure 15F:
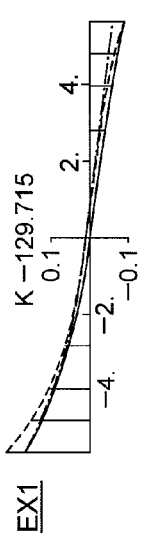
Figure 15G:
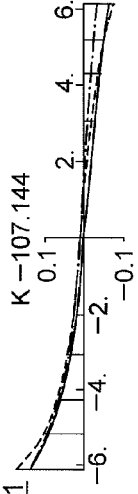
Figure 15H:
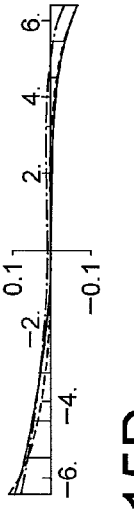
Figure 15I:
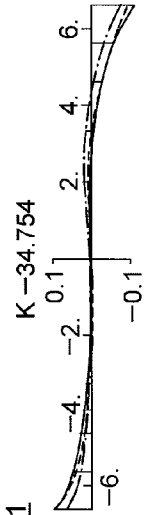
Figure 17A:
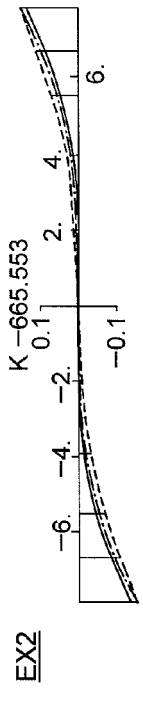
FIGS. 17A through 17I show transversal aberration of the wide-angle lens according to Example 2 at the focus position 2.
Figure 17B:
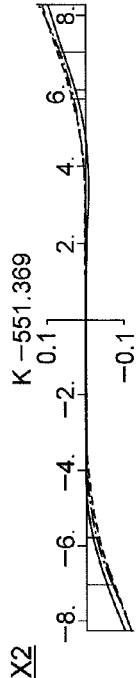
Figure 17C:
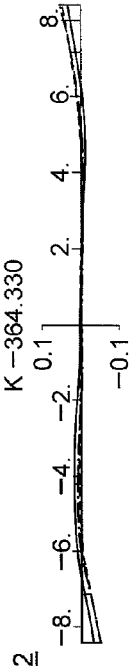
Figure 17D:
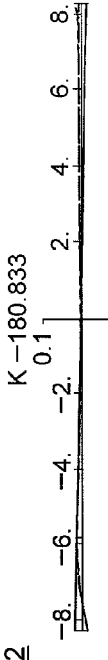
Figure 17F:
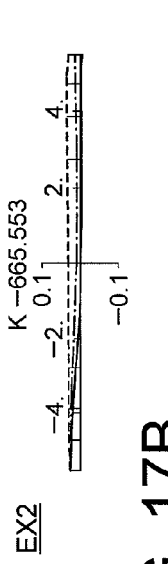
Figure 17G:
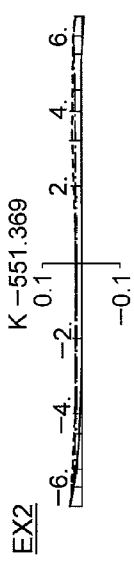
Figure 17H:
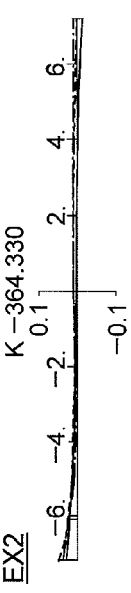
Figure 17I:
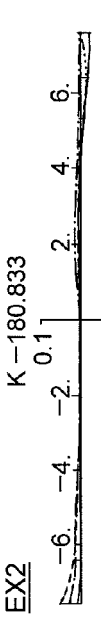
Figure 17E:
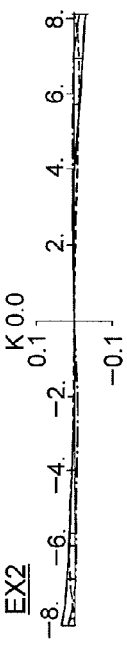
Figure 19A:
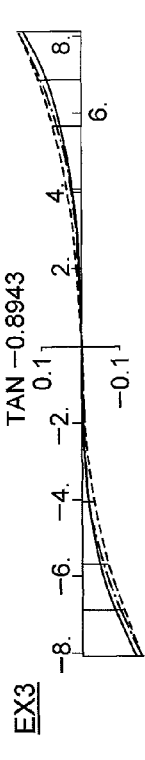
FIGS. 19A through 19I show transversal aberration of the wide-angle lens according to Example 3 at the focus position 1.
Figure 19B:
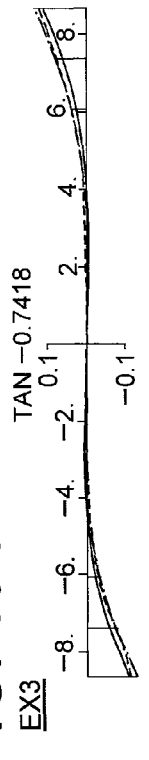
Figure 19C:
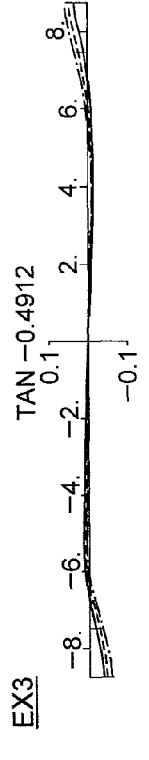
Figure 19D:
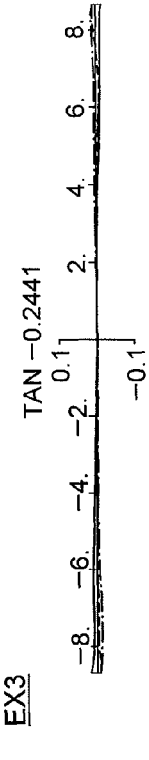
Figure 19F:
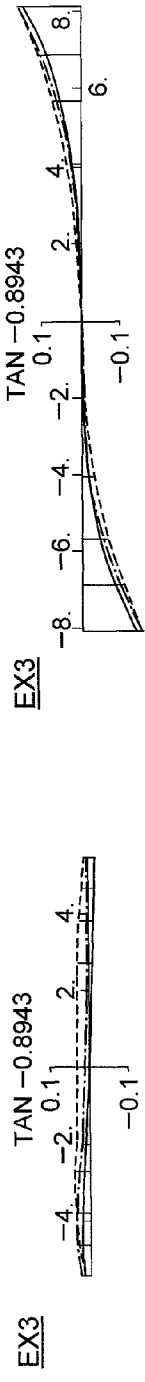
Figure 19G:
Figure 19H:
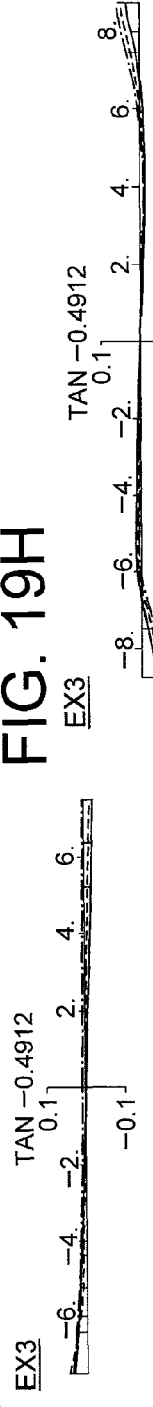
Figure 19I:
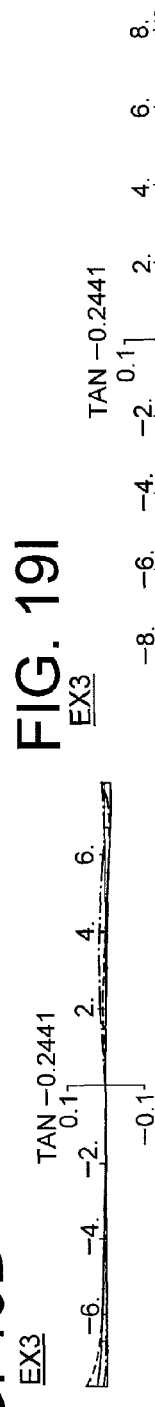
Figure 19E:
Figure 20A:
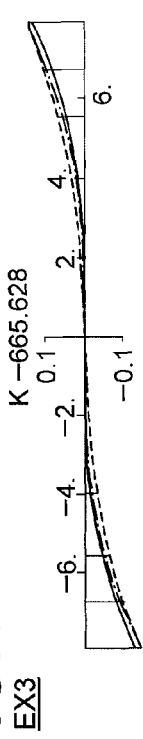
FIGS. 20A through 20I show transversal aberration of the wide-angle lens according to Example 3 at the focus position 2.
Figure 20B:
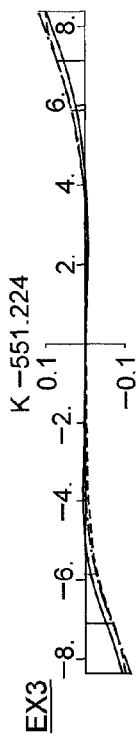
Figure 20C:
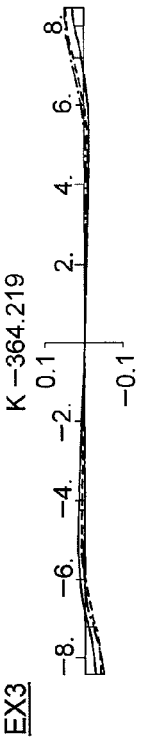
Figure 20D:
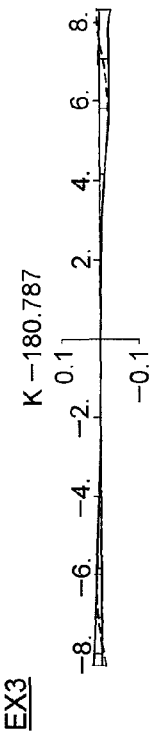
Figure 20F:
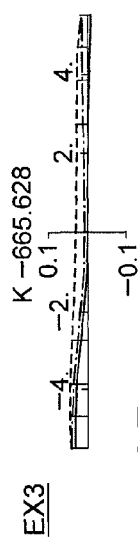
Figure 20G:
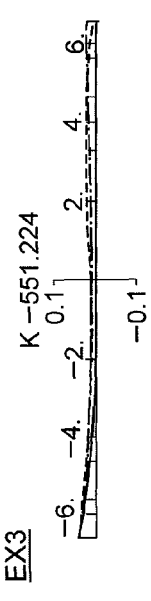
Figure 20H:
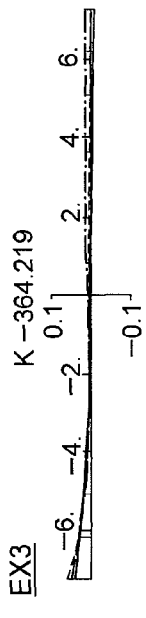
Figure 20I:
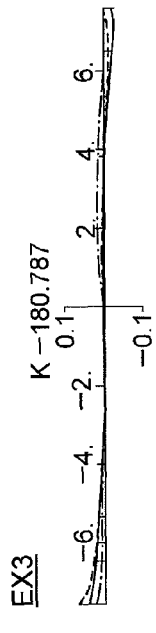
Figure 20E:
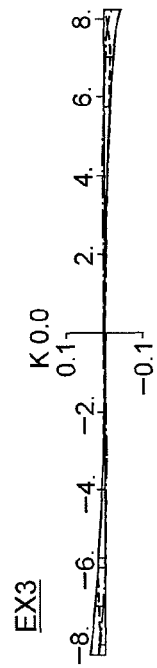

The lens configuration of the first lens group that consists of the first lens having negative refractive power, the second lens having negative refractive power, the third lens having a concave surface facing the object side, and the fourth lens having positive refractive power corresponds to the first lens group Gr1 (FIGS. 2 and 3) of Examples 2 and 3 explained later. Conditional expression (5) defines an appropriate range of the thickness along the optical axis of the third lens in the first lens group. With satisfying conditional expression (5) and giving relatively weak power to the third lens having a concave surface facing the object side, it becomes possible to suitably adjust the height of an incident ray on the fourth lens having positive refractive power. Moreover, with adjusting the height of off-axis ray, it becomes possible to correct coma and astigmatism. When the ratio T13/fL is equal to or exceeds the upper limit of conditional expression (5), the thickness of the third lens becomes too large, so that weight of the lens becomes large. Moreover, the height of incident ray on the fourth lens having positive refractive power becomes high, so that correction of coma becomes excessive. On the other hand, when the ratio T13/fL is equal to or falls below the lower limit of conditional expression (5), the thickness of the third lens becomes too thin, the effect of correction of aberration becomes small. For example, astigmatism becomes under correction.

It is preferable that the first lens group that consists of the first lens having negative refractive power, the second lens having negative refractive power, the third lens having a concave surface facing the object side, and the fourth lens having positive refractive power satisfies the following conditional expression (6):

$$-0.03 < fL/f13 < 0.02 \quad (6)$$

where f13 denotes a focal length of the third lens in the first lens group.

Conditional expression (6) defines an appropriate range of power of the third lens in the first lens group. When the ratio fL/f13 is equal to or falls below the lower limit of conditional expression (6), negative power of the third lens becomes too strong, so that it becomes difficult to correct distortion. On the other hand, when the ratio fL/f13 is equal to or exceeds the upper limit of conditional expression (6), positive power of the third lens becomes too strong, so that it becomes difficult to correct coma.

The second lens group preferably satisfy the following conditional expression (7):

$$0.5 < fL/f2 < 0.65 \quad (7)$$

where f2 denotes a focal length of the second lens group.

Conditional expression (7) defines a ratio of the focal length of the wide-angle lens to that of the second lens group. Conditional expression (7) is about afocal magnification of the first lens group (converter magnification) with respect to the second lens group. In the present optical system, the first lens group is substantially an afocal system, so that variation in optical performance of the second lens group upon focusing is made to be small. Conditional expression (7) as an afocal magnification of the first lens group is preferably satisfied. When the ratio fL/f2 is equal to or exceeds the upper limit of conditional expression (7), the focal length of the second lens group becomes small, so that in order to secure the back focal length, the degree of retrofocus of the second lens group has to be strong. Accordingly, variation in optical performance upon focusing becomes large, so that it is undesirable. On the other hand, when the ratio fL/f2 is equal to or falls below the lower limit of conditional expression (7), the focal length of the second lens group becomes large. Although it is desirable to correct aberrations in the second lens group, converter magnification of the first lens group becomes large, so that it becomes difficult to correct distortion.

A wide-angle lens according to the present invention is suitable for using an imaging lens for a digital equipment (for example, a digital camera) equipped with an image input function. With combining this together with an imaging device, it becomes possible to construct an imaging optical apparatus that optically inputs an image of an object and outputs as an electrical signal. The imaging optical apparatus is an optical apparatus composing main elements of a camera used for taking still image or movie of an object, and is composed of, for example, in order from the object side, a wide-angle lens for forming an optical image of the object, and an imaging device for converting the optical image formed by the wide-angle lens into an electrical signal.

As for an example of a camera, there are a digital camera, a video camera, a surveillance camera, an onboard camera, a camera for a TV phone. Moreover, a camera installed in or attached to a personal computer, a portable information device (for example, a compact portable terminal such as a mobile computer, a cellular phone, a personal digital assistant), a peripheral thereof (a scanner, a printer). As understood from these examples, with using the imaging optical apparatus, a camera can be constructed as well as with adopting the imaging optical apparatus to various digital equipments, it becomes possible to add a camera function. For example, a digital equipment with an image input function such as a cellular phone with a camera can be constructed.

Figure 25:
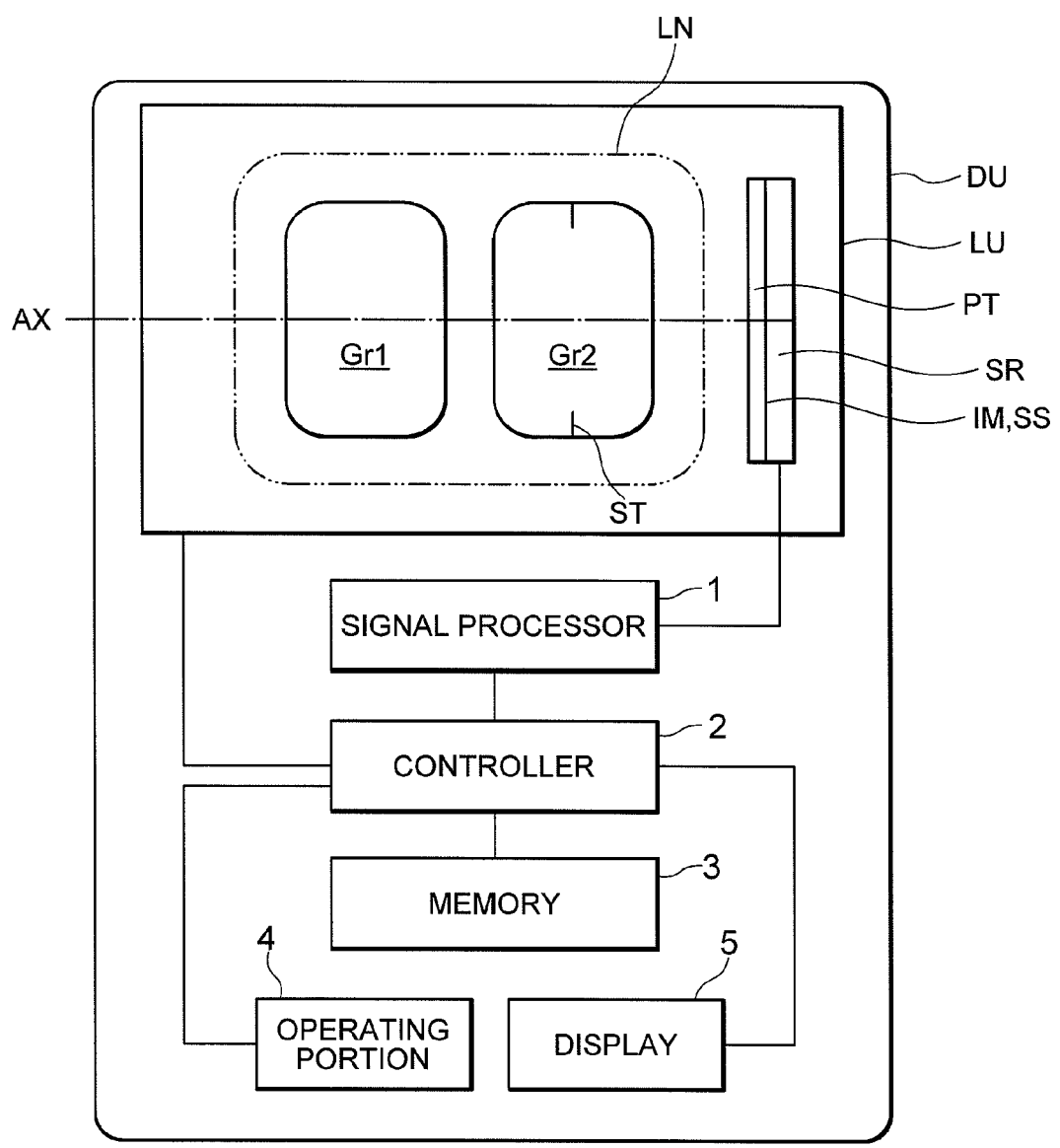
FIG. 25 is a block diagram schematically showing a digital equipment equipped with an imaging optical apparatus according to the present invention.

FIG. 25 is a block diagram schematically showing a digital equipment DU having an image input function. The imaging optical apparatus LU installed in the digital equipment DU shown in FIG. 25 is equipped with, in order from the object (object to be shot) side, a wide-angle lens LN (AX: optical axis) for forming an optical image IM of the object, a plane parallel plate PT (corresponding to an optical filter provided as needed such as an optical low-pass filter, an infrared light blocking filter, or a cover glass for an imaging device SR), and an imaging device SR that converts the optical image IM formed on a detecting surface SS by the wide-angle lens LN into an electric signal. When a digital equipment DU with an image input function is constructed by using the imaging optical apparatus LU, the imaging optical apparatus LU is usually disposed in the body thereof. In order to realize a camera function, a form depending on the situation can be adopted. For example, a unitized imaging optical apparatus LU is removably or rotatably attached the main body of the digital equipment DU.

As for the imaging device SR, there are for example, a solid-state imaging device with plurality of pixels such as a CCD image sensor, and a CMOS image sensor. Since the wide-angle lens LN is disposed for forming an optical image IM of the object on the detecting surface SS of the imaging device SR, the optical image IM formed by the wide-angle lens LN is converted into an electrical signal.

The digital equipment DU is equipped with a signal processor 1, a controller 2, a memory 3, an operating portion 4, and a display 5 other than the imaging optical apparatus LU. A signal generated by the imaging device SR is carried out necessary processing such as a given digital image processing and image compression by the signal processor 1, and stored as a digital image signal in the memory 3 (such as a semiconductor memory, and an optical disk), or converted into an infrared signal to be transferred to another instrument (for example, communication function of a cellular phone). The controller 2 is composed of a microcomputer and intensively carries out image capturing function (still image taking function, movie shooting function, and the like), control of reproduction of an image, and control of a lens moving mechanism for focusing. For example, the controller 2 controls the imaging optical apparatus LU to carry out at least one of shooting a still image and shooting movie of an object. The display 5 is a portion including a display such as a liquid crystal monitor, and displays an image using an image signal converted by the imaging device SR or image information stored in the memory 3. The operating portion 4 is a portion including an operating member such as an operating button (for example, a shutter release button), and a operating dial (for example, shooting mode dial), and transfers information input by an operator to the controller 2.

As described above, the wide-angle lens LN consists of, in order from the object side, a first lens group Gr1 having positive refractive power, and a second lens group Gr2 having positive refractive power. Focusing to a close object is carried out by moving the second lens group Gr2 to the object side with fixing the first lens group Gr1 so as to form an optical image IM on a detecting surface SS of an imaging device SR. A spatial frequency characteristic of the optical image IM to be formed by the wide-angle lens LN is adjusted such that, for example, with passing through an optical low-pass filter (plane parallel plate PT in FIG. 25) having a given cutoff frequency characteristic determined by a pixel pitch of the imaging device SR, a so-called folding noise generated upon converting into an electrical signal is to become minimum. Accordingly, generation of color moiré can be suppressed. However, when optical performance in the vicinity of diffraction limit frequency is suppressed, it does not need to worry about generation of noise without using an optical low-pass filter. Moreover, when a user takes picture or observes an image by using a noise-inconspicuous display (for example, a liquid crystal display of a cellular phone), an optical low-pass filter does not need to be used.

Then, an optical configuration of a wide-angle lens LN is explained in detail with mentioning a first through fourth embodiments. Sectional views of wide-angle lenses LN in a state focusing on infinity according to the first through the fourth embodiments are shown in lens configuration diagrams shown in FIGS. 1 through 4, and in optical path diagrams shown in FIGS. 5 through 8, respectively. Movement of focusing lens group (second lens group Gr2) upon focusing from infinity to a closest rang object is shown by an arrow mF in FIGS. 1 through 4 (first lens group Gr1 is fixed upon focusing). In FIGS. 1 through 4, POS1 denotes a state focusing on infinity object, POS2 denotes a state focusing on an intermediate distance object, and POS3 denotes a state focusing on a closest range object. In each wide-angle lens LN according to the first through the fourth embodiments, a single focal length lens having a focal length fL of about 24 mm, and f-number of about 1.4 is considered.

A wide-angle lens LN (FIGS. 1 and 5) according to the first embodiment is composed of, in order from an object side, a first lens group Gr1 having positive refractive power, and a second lens group Gr2 having positive refractive power. The first lens group Gr1 is composed of a front lens group Gr1A and a rear lens group Gr1B. The second lens group Gr2 is composed of a front lens group Gr2A, an aperture stop ST and a rear lens group Gr2B. The front lens group Gr1A of the first lens group Gr1 is composed of, in order from the object side, a first lens L11 having negative refractive power with a concave surface facing an image side, and a second lens L12 having negative refractive power with a concave surface facing the image side (an aspherical surface is formed on the image side surface). The rear lens group Gr1B of the first lens group Gr1 is composed of a third lens L13 having positive refractive power with a double convex shape. The front lens group Gr2A of the second lens group Gr2 is composed of, in order from the object side, a negative meniscus lens L21 having a concave surface facing the image side, a double convex positive lens L22, and a cemented L23 constructed by a double convex positive lens cemented with a double concave negative lens. The rear lens group Gr2B of the second lens group Gr2 is composed of three lens blocks which are, in order from the object side, a first lens block L24 having negative refractive power constructed by a double concave negative lens (an aspherical surface is formed on the image side) cemented with a double convex positive lens, a second lens block L25 having positive refractive power constructed by a double convex positive lens, and a third lens block L26 having positive refractive power constructed by a positive meniscus lens having a convex surface facing the image side.

A wide-angle lens LN (FIGS. 2 and 6) according to the second embodiment is composed of, in order from an object side, a first lens group Gr1 having positive refractive power, and a second lens group Gr2 having positive refractive power. The first lens group Gr1 is composed of a front lens group Gr1A and a rear lens group Gr1B. The second lens group Gr2 is composed of a front lens group Gr2A, an aperture stop ST and a rear lens group Gr2B. The front lens group Gr1A of the first lens group Gr1 is composed of, in order from the object side, a first lens L11 having negative refractive power with a concave surface facing an image side, and a second lens L12 having negative refractive power with a concave surface facing the image side (an aspherical surface is formed on the image side surface). The rear lens group Gr1B of the first lens group Gr1 is composed of a third lens L13 having a concave surface facing the object side, and a fourth lens L14 having positive refractive power with a double convex shape. The front lens group Gr2A of the second lens group Gr2 is composed of, in order from the object side, a negative meniscus lens L21 having a concave surface facing the image side, a double convex positive lens L22, and a cemented L23 constructed by a positive meniscus lens having a convex surface facing the image side cemented with a double concave negative lens. The rear lens group Gr2B of the second lens group Gr2 is composed of three lens blocks which are, in order from the object side, a firs lens block L24 having negative refractive power constructed by a double concave negative lens (an aspherical surface is formed on the image side) cemented with a double convex positive lens, a second lens block L25 having positive refractive power constructed by a double convex positive lens, and a third lens block L26 having positive refractive power constructed by a positive meniscus lens having a convex surface facing the image side.

A wide-angle lens LN (FIGS. 3 and 7) according to the third embodiment is composed of, in order from an object side, a first lens group Gr1 having positive refractive power, and a second lens group Gr2 having positive refractive power. The first lens group Gr1 is composed of a front lens group Gr1A and a rear lens group Gr1B. The second lens group Gr2 is composed of a front lens group Gr2A, an aperture stop ST and a rear lens group Gr2B. The front lens group Gr1A of the first lens group Gr1 is composed of, in order from the object side, a first lens L11 having negative refractive power with a concave surface facing an image side, and a second lens L12 having negative refractive power with a concave surface facing the image side (an aspherical surface is formed on the image side surface). The rear lens group Gr1B of the first lens group Gr1 is composed of a third lens L13 having a concave surface facing the object side, and a fourth lens L14 having positive refractive power with a double convex shape. The front lens group Gr2A of the second lens group Gr2 is composed of, in order from the object side, a double concave negative L21, a double convex positive lens L22, and a cemented L23 constructed by a positive meniscus lens having a convex surface facing the image side cemented with a double concave negative lens. The rear lens group Gr2B of the second lens group Gr2 is composed of three lens blocks which are, in order from the object side, a firs lens block L24 having negative refractive power constructed by a double concave negative lens (an aspherical surface is formed on the image side) cemented with a double convex positive lens, a second lens block L25 having positive refractive power constructed by a double convex positive lens, and a third lens block L26 having positive refractive power constructed by a positive meniscus lens having a convex surface facing the image side.

A wide-angle lens LN (FIGS. 4 and 8) according to the fourth embodiment is composed of, in order from an object side, a first lens group Gr1 having positive refractive power, and a second lens group Gr2 having positive refractive power. The first lens group Gr1 is composed of a front lens group Gr1A and a rear lens group Gr1B. The second lens group Gr2 is composed of a front lens group Gr2A, an aperture stop ST and a rear lens group Gr2B. The front lens group Gr1A of the first lens group Gr1 is composed of, in order from the object side, a first lens L11 having negative refractive power with a concave surface facing an image side, and a second lens L12 having negative refractive power with a concave surface facing the image side (an aspherical surface is formed on the image side surface). The rear lens group Gr1B of the first lens group Gr1 is composed of a third lens L13 having positive refractive power with a double convex shape. The front lens group Gr2A of the second lens group Gr2 is composed of, in order from the object side, a negative meniscus lens L21 having a concave surface facing the image side, a double convex positive lens L22, and a cemented L23 constructed by a double convex positive lens cemented with a double concave negative lens. The rear lens group Gr2B of the second lens group Gr2 is composed of three lens blocks which are, in order from the object side, a firs lens block L24 having negative refractive power constructed by a double concave negative lens (an aspherical surface is formed on the image side) cemented with a double convex positive lens, a second lens block L25 having positive refractive power constructed by a double convex positive lens, and a third lens block L26 having positive refractive power constructed by a positive meniscus lens having a convex surface facing the image side.

Configuration of each wide-angle lens practiced the present invention is explained in detail with mentioning construction data of each example. Examples 1 through 4 mentioned below are numerical examples corresponding to the above-described first through fourth embodiments, respectively.

In construction data of each example, in [Specifications], f denotes a focal length of a wide-angle lens (mm), FNO denotes an f-number, 2ω denotes an angle of view (degree), y' max denotes an image height (mm), TL denotes a total lens length (mm), and BF denotes a back focal length (mm).

In [Lens Data], the left most column "i" shows optical surface number, the second column "r" shows a radius of curvature of each optical surface (mm), the third column "d" shows a surface distance (mm), the fourth column "nd" shows a refractive index at d-line (wavelength: 587.56 nm), the fifth column "υd" shows an Abbe number at d-line, and the sixth column "fi" shows a focal length of a single lens. In [Variable Distances], POS1 denotes a state where the object distance is infinity, POS2 denotes a state where the object distance is an intermediate distance, and POS3 denotes a state where the object distance is the closest distance. Lateral magnification β, variable distances, and BF with respect to each position are shown.

A surface attached with "*" is an aspherical surface, and the shape of the surface is defined by the following expression (AS) using a local rectangular coordinates (x, y, z) making the vertex of the surface as the origin. Aspherical coefficients are shown as aspherical data. In [Aspherical Data], a coefficient with no written data means 0, and E–n denotes ×10$^{-n}$.

$$Z=(c \cdot h^2)/\{1+(1-\epsilon \cdot c^2 \cdot h^2)^{-2}\}+\Sigma(Aj \cdot h^j) \quad (AS)$$

where h denotes a vertical height ($h^2=x^2+y^2$) from z axis (optical axis AX), z denotes a sag amount (reference based on the surface vertex) in the optical axis AX direction at the height of h, c denotes curvature at the vertex of the surface (a reciprocal of a radius of curvature r), ϵ denotes parameter of a quadratic surface, and Aj denotes an aspherical coefficient of j-th order.

In Table 1, each focal length of the first lens group Gr1, the second lens group Gr2, the front lens group Gr1A of the first lens group Gr1, the rear lens group Gr1B of the first lens group Gr1, the front lens group Gr2A of the second lens group Gr2, and the rear lens group Gr2B of the second lens group Gr2 is listed. In Table 2, values for conditional expressions with respect to Example 1 through 4 are shown.

FIGS. 9A through 12C are longitudinal aberrations (from left to right, spherical aberration, astigmatism, and distortion) with respect to each focus position (POS1, POS2 and POS3) corresponding to respective Examples 1 through 4. In FIGS. 9A through 12C, FNO denotes an f-number, Y' denotes the maximum image height (y' max: corresponding to a distance from the optical axis AX) on the detection surface SS of the imaging device SR. In graphs showing spherical aberration, a solid line shows spherical aberration (mm) at d-line, a dashed line shows that at g-line, and a chain double-dashed line shows that at C-line, and a broken line shows sine condition dissatisfied amount (mm). In graphs showing astigmatism, a broken line DM shows astigmatism (mm) of a meridional plane at d-line, and a solid line DS shows astigmatism (mm) of a sagittal plane at d-line. In graphs showing distortion, a solid line shows distortion (%) at d-line.

FIGS. 13A through 15I show lateral aberrations of a wide-angle lens according to Example 1, FIGS. 16A through 18I show lateral aberrations of a wide-angle lens according to Example 2, FIGS. 19A through 21I show lateral aberrations of a wide-angle lens according to Example 3, and FIGS. 22A through 24I show lateral aberrations of a wide-angle lens according to Example 4. FIGS. 13, 16, 19 and 22 show lateral aberrations at POS1 (focusing on infinity), FIGS. 14, 17, 20 and 23 show lateral aberrations at POS2 (focusing on intermediate distance), and FIGS. 15, 18, 21 and 24 show lateral aberrations at POS3 (focusing on closest distance). In FIGS. 13A through 24, graphs located left side of each sheet (FIGS. 13A-13E, 14A-14E, 15A-15E, 16A-16E, 17A-17E, 18A-18E, 19A-19E, 20A-20E, 21A-21E, 22A-22E, 23A-23E and 24A-24E) show lateral aberration of meridional image (mm), and graphs located right side of each sheet (FIGS. 13F-13I, 14F-14I, 15F-15I, 16F-16I, 17F-17I, 18F-18I, 19F-19I, 20E-20I, 21F-21I, 22F-22I, 23F-23I and 24F-24I) show lateral aberration of sagittal image (mm), in which a solid line shows d-line, a chain line shows g-line, a chain double-dashed line shows C-line. In POS1, value of TAN in lateral aberration is tan ω. In POS2 and POS3, value of K in lateral aberration is an object height (mm) with respect to an image height Y'. Incidentally, a tick of vertical scale is 0.1 mm, and a tick of horizontal scale is 2.0 mm.

EXAMPLE 1

[Specifications]
f = 24.68
FNO = 1.45
2ω = 83.59°
y'max = 21.6
TL = 127.04
BF = 37.85

[Lens Data]

| i | r | d | nd | νd | fi |
|---|---|---|---|---|---|
| 1 | 49.552 | 2.309 | 1.83400 | 37.34 | −55.371 |
| 2 | 23.396 | 8.028 | | | |
| 3 | 32.895 | 1.500 | 1.77250 | 49.36 | −105.981 |
| 4* | 23.000 | 20.000 | | | |
| 5 | 51.669 | 4.591 | 1.84666 | 23.78 | 56.865 |
| 6 | −677.204 | (d6) | | | |
| 7 | 250.000 | 1.250 | 1.49700 | 81.61 | −75.316 |
| 8 | 32.503 | 4.396 | | | |
| 9 | 30.409 | 8.367 | 1.74100 | 52.60 | 31.715 |
| 10 | −91.336 | 0.150 | | | |
| 11 | 506.247 | 5.000 | 1.69680 | 55.46 | −75.031 |
| 12 | −37.120 | 1.250 | 1.71736 | 29.50 | |
| 13 | 50.451 | 3.493 | | | |
| 14 | ∞ | 5.528 | Aperture Stop ST | | |
| 15 | −22.370 | 1.285 | 1.72825 | 28.32 | −64.487 |
| 16 | 51.961 | 4.984 | 1.77250 | 49.36 | |
| 17* | −53.166 | 2.039 | | | |
| 18 | 378.927 | 6.150 | 1.59319 | 67.90 | 50.282 |
| 19 | −32.179 | 0.150 | | | |
| 20 | −57.983 | 3.904 | 1.72916 | 54.67 | 84.023 |
| 21 | −30.636 | (BF) | | | |

[Aspherical Data]

surface Number: 4

ε = 0.6292
A4 = −0.15557460E−5
A6 = −0.13939289E−7
A8 = 0.27485010E−10
A10 = −0.65858662E−13 surface Number: 17

ε = 1.0000
A4 = 0.19281313E−4
A6 = 0.15786425E−7
A8 = −0.47525462E−11
A10 = −0.51366647E−13
A12 = −0.16907605E−15
A14 = 0.37294340E−18

[Variable Distances]

| | POS1 | POS2 | POS3 |
|---|---|---|---|
| β = | 0.0 | −0.033 | −0.174 |
| d0 = | ∞ | 717.21 | 117.2 |
| d6 = | 4.817 | 3.994 | 0.534 |
| BF = | 37.852 | 38.675 | 42.129 |

EXAMPLE 2

[Specifications]
f = 24.68
FNO = 1.45
2ω = 83.77°
y'max = 21.6
TL = 131.09
BF = 37.8

[Lens Data]

| i | r | d | nd | νd | fi |
|---|---|---|---|---|---|
| 1 | 45.193 | 2.424 | 1.80610 | 33.27 | −63.842 |
| 2 | 23.486 | 5.372 | | | |
| 3 | 31.502 | 1.500 | 1.77250 | 49.36 | −91.901 |
| 4* | 21.367 | 17.447 | | | |
| 5 | −38.462 | 4.500 | 1.60311 | 60.69 | −996.595 |
| 6 | −42.900 | 2.518 | | | |
| 7 | 46.181 | 4.831 | 1.80518 | 25.46 | 56.814 |
| 8 | −4623.850 | (d8) | | | |
| 9 | 1477.760 | 1.250 | 1.49700 | 81.61 | −83.056 |
| 10 | 40.146 | 5.483 | | | |
| 11 | 34.761 | 7.926 | 1.72916 | 54.67 | 33.584 |
| 12 | −74.899 | 0.150 | | | |
| 13 | −233.037 | 5.000 | 1.60625 | 63.71 | −77.378 |
| 14 | −32.244 | 1.100 | 1.67270 | 32.17 | |
| 15 | 82.506 | 4.726 | | | |
| 16 | ∞ | 5.598 | Aperture Stop ST | | |
| 17 | −23.439 | 1.200 | 1.71736 | 29.50 | −74.217 |
| 18 | 43.743 | 5.437 | 1.77250 | 49.36 | |
| 19* | −54.185 | 1.730 | | | |
| 20 | 260.804 | 6.500 | 1.59319 | 67.90 | 45.53 |
| 21 | −29.848 | 0.150 | | | |
| 22 | −46.906 | 3.473 | 1.69680 | 55.46 | 132.341 |
| 23 | −32.037 | (BF) | | | |

[Aspherical Data]

surface Number: 4

ε = 0.4285
A4 = 0.23049195E−5
A6 = −0.33268605E−7
A8 = 0.28182650E−9
A10 = −0.14817056E−11
A12 = 0.43700825E−14
A14 = −0.69357623E−17
A16 = 0.44709320E−20 surface Number: 19

ε = 2.5295
A4 = 0.18758301E−4
A6 = 0.73176386E−8
A8 = 0.72874934E−10
A10 = −0.41380628E−12
A12 = 0.17495053E−15
A14 = 0.31115593E−17
A16 = −0.62662303E−20

[Variable Distances]

| | POS1 | POS2 | POS3 |
|---|---|---|---|
| β = | 0.0 | −0.033 | −0.177 |
| d0 = | ∞ | 717.21 | 113 |
| d8 = | 4.976 | 4.150 | 0.614 |
| BF = | 37.800 | 38.626 | 42.162 |

EXAMPLE 3

[Specifications]
f = 24.68
FNO = 1.43
2ω = 83.64°
y'max = 21.6
TL = 132.9
BF = 37.86

[Lens Data]

| i | r | d | nd | νd | fi |
|---|---|---|---|---|---|
| 1 | 45.969 | 2.070 | 1.80610 | 33.27 | −64.824 |
| 2 | 23.964 | 5.220 | | | |
| 3 | 31.781 | 2.500 | 1.77250 | 49.36 | −91.613 |
| 4* | 21.180 | 17.448 | | | |
| 5 | −37.750 | 4.660 | 1.60311 | 60.69 | −1222.715 |
| 6 | −41.635 | 3.000 | | | |
| 7 | 50.868 | 7.100 | 1.80518 | 25.46 | 58.003 |
| 8 | −534.811 | (d8) | | | |
| 9 | −1096.936 | 1.600 | 1.49700 | 81.61 | −88.012 |
| 10 | 45.581 | 3.985 | | | |
| 11 | 35.542 | 7.985 | 1.72916 | 54.67 | 34.051 |
| 12 | −74.565 | 0.150 | | | |
| 13 | −358.953 | 5.000 | 1.60625 | 63.71 | −74.56 |
| 14 | −32.990 | 0.010 | 1.51400 | 42.83 | |
| 15 | −32.990 | 1.100 | 1.67270 | 32.17 | |
| 16 | 69.897 | 4.126 | | | |
| 17 | ∞ | 6.229 | | Aperture Stop ST | |
| 18 | −22.523 | 1.200 | 1.71736 | 29.50 | −66.961 |
| 19 | 46.362 | 0.010 | 1.51400 | 42.83 | |
| 20 | 46.362 | 5.093 | 1.77250 | 49.36 | |
| 21* | −54.645 | 1.088 | | | |
| 22 | 214.220 | 6.496 | 1.59319 | 67.90 | 45.97 |
| 23 | −30.894 | 0.150 | | | |
| 24 | −49.484 | 3.845 | 1.69680 | 55.46 | 106.656 |
| 25 | −30.653 | (BF) | | | |

[Aspherical Data]

Surface Number: 4

$\epsilon = 0.4101$
$A4 = 0.24978400E-5$
$A6 = -0.29453434E-7$
$A8 = 0.25768918E-9$
$A10 = -0.14009078E-11$
$A12 = 0.43225532E-14$
$A14 = -0.72151872E-17$
$A16 = 0.49023334E-20$ Surface Number: 21

$\epsilon = 2.4546$
$A4 = 0.18775703E-4$
$A6 = 0.81063935E-8$
$A8 = 0.52993933E-10$
$A10 = -0.27772358E-12$
$A12 = -0.17561293E-15$
$A14 = 0.29552390E-17$
$A16 = -0.48207586E-20$

[Variable Distances]

| | POS1 | POS2 | POS3 |
|---|---|---|---|
| β = | 0.0 | −0.033 | −0.179 |
| d0 = | ∞ | 717.21 | 112.5 |
| d8 = | 4.971 | 4.145 | 0.561 |
| BF = | 37.865 | 38.690 | 42.274 |

EXAMPLE 4

[Specifications]
f = 24.68
FNO = 1.47
2ω = 83.6°
y'max = 21.6
TL = 127.35
BF = 37.86

[Lens Data]

| i | r | d | nd | νd | fi |
|---|---|---|---|---|---|
| 1 | 50.254 | 3.000 | 1.83400 | 37.34 | −55.59 |
| 2 | 23.460 | 7.451 | | | |
| 3 | 33.019 | 2.384 | 1.77250 | 49.36 | −102.589 |
| 4* | 22.592 | 21.000 | | | |
| 5 | 50.576 | 4.457 | 1.84666 | 23.78 | 57.477 |
| 6 | −1234.751 | (d6) | | | |
| 7 | 250.000 | 1.250 | 1.49700 | 81.61 | −76.132 |
| 8 | 32.809 | 3.426 | | | |
| 9 | 30.745 | 8.148 | 1.74100 | 52.60 | 31.675 |
| 10 | −88.024 | 0.284 | | | |
| 11 | 838.378 | 5.000 | 1.69680 | 55.46 | −78.285 |
| 12 | −35.519 | 0.010 | 1.51400 | 42.83 | |
| 13 | −35.519 | 1.364 | 1.71736 | 29.50 | |
| 14 | 54.915 | 2.925 | | | |
| 15 | ∞ | 5.904 | | Aperture Stop ST | |
| 16 | −22.174 | 1.463 | 1.72825 | 28.32 | −67.3 |
| 17 | 51.308 | 0.010 | 1.51400 | 42.83 | |
| 18 | 51.308 | 5.000 | 1.77250 | 49.36 | |
| 19* | −50.528 | 1.589 | | | |
| 20 | 341.629 | 6.150 | 1.59319 | 67.90 | 49.459 |
| 21 | −31.879 | 0.150 | | | |
| 22 | −49.573 | 3.728 | 1.72916 | 54.67 | 91.481 |
| 23 | −29.340 | | | | |

[Aspherical Data]

Surface Number: 4

$\epsilon = 0.1281$
$A4 = 0.34896653E-5$
$A6 = -0.80818462E-8$
$A8 = 0.23070340E-10$
$A10 = -0.55717140E-13$ Surface Number: 19

$\epsilon = 1.0000$
$A4 = 0.19385256E-4$
$A6 = 0.15869350E-7$
$A8 = -0.32201545E-10$
$A10 = 0.33277727E-12$
$A12 = -0.18638752E-14$
$A14 = 0.28841721E-17$

[Variable Distances]

| | POS1 | POS2 | POS3 |
|---|---|---|---|
| β = | 0.0 | −0.033 | −0.174 |
| d0 = | ∞ | 719.64 | 122.65 |
| d6 = | 4.801 | 3.979 | 0.520 |
| BF = | 37.860 | 38.682 | 42.141 |

TABLE 1

| | focal length | | | | | |
|---|---|---|---|---|---|---|
| | Gr1 | Gr2 | Gr1A | Gr1B | Gr2A | Gr2B |
| Ex. 1 | 1228.2 | 42.05 | −34.3 | 56.9 | 118.7 | 45.1 |
| Ex. 2 | 370.8 | 43.05 | −36.1 | 57.4 | 127.2 | 47.9 |
| Ex. 3 | 364.8 | 43.71 | −36.0 | 57.9 | 136.1 | 47.2 |
| Ex. 4 | 2847.9 | 42.5 | −33.8 | 57.5 | 113.4 | 45.9 |

TABLE 2

|      | (1) f1/fL | (2) T/fL | (3) f21/fL | (4) vd2 |
|------|-----------|----------|------------|---------|
| Ex. 1 | 49.8  | 0.81 | −3.1 | 67.9 |
| Ex. 2 | 15.0  | 0.99 | −3.4 | 67.9 |
| Ex. 3 | 14.8  | 1.02 | −3.6 | 67.9 |
| Ex. 4 | 115.4 | 0.85 | −3.1 | 67.9 |

|      | (5) T13/fL | (6) fL/f13 | (7) fL/f2 |
|------|------------|------------|-----------|
| Ex. 1 | —    | —      | 0.59 |
| Ex. 2 | 0.18 | −0.025 | 0.57 |
| Ex. 3 | 0.19 | −0.020 | 0.56 |
| Ex. 4 | —    | —      | 0.58 |

What is claimed is:

1. A wide-angle lens consisting of, in order from an object side:

a first lens group having positive refractive power; and
a second lens group having positive refractive power;
the second lens group being movable toward the object side with fixing the first lens group, thereby carrying out focusing on a close object, and
the following conditional expression being satisfied:

$10 < f1/fL < 150$ where f1 denotes a focal length of the first lens group, and fL denotes a focal length of the wide-angle lens.

2. The wide-angle lens according to claim 1, wherein the first lens group includes, in order from the object side, a first lens having negative refractive power with a concave surface facing an image side, a second lens having negative refractive power with a concave surface facing the image side, and at least one lens component having positive refractive power with a convex surface facing the object side disposed to the image side of the second lens, and one lens component having shorter focal length among said at least one lens component satisfies the following conditional expression:

$0.6 < T/fL < 1.25$ where T denotes a distance from a vertex of an image side surface of the second lens to a vertex of an object side surface of the lens component having positive refractive power with a convex surface facing the object side.

3. The wide-angle lens according to claim 1, wherein the first lens group includes at least one negative lens, and the negative lens in the first lens group includes at least one aspherical surface.

4. The wide-angle lens according to claim 3, wherein the first lens group includes, in order from the object side, a first lens having negative refractive power with a concave surface facing an image side, and a second lens having negative refractive power with a concave surface facing an image side, and the aspherical surface is formed on the image side surface of the second lens.

5. The wide-angle lens according to claim 1, wherein the second lens group consists of, in order from the object side, a front lens group having positive refractive power, an aperture stop, and a rear lens group having positive refractive power, and the most object side lens in the front lens group is a negative lens.

6. The wide-angle lens according to claim 5, wherein the most object side lens in the front lens group satisfies the following conditional expression:

$-4 < f21/fL < -2.5$ where f21 denotes a focal length of the most object side lens in the front lens group.

7. The wide-angle lens according to claim 5, wherein the rear lens group consists of three lens blocks which are, in order from the object side, a first lens block having negative refractive power, a second lens block having positive refractive power, and a third lens block having positive refractive power, and the second lens block satisfies the following conditional expression:

$65 < \upsilon d2$ where υd2 denotes an Abbe number of the second lens block or an Abbe number of a positive lens composing the second lens block when the second lens block is a cemented lens.

8. The wide-angle lens according to claim 5, wherein the rear lens group consists of three lens blocks which are, in order from the object side, a first lens block having negative refractive power, a second lens block having positive refractive power, and a third lens block having positive refractive power, and at least one aspherical surface is formed on the image side surface of the first lens block.

9. The wide-angle lens according to claim 1, wherein the first lens group consists of, in order from the object side, a first lens having negative refractive power, a second lens group having negative refractive power, a third lens having a concave surface facing the object side, and a fourth lens having positive refractive power, and the following conditional expression is satisfied:

$0.1 < T13/fL < 0.25$ where T13 denotes a thickness of the third lens in the first lens group.

10. The wide-angle lens according to claim 9, wherein the following conditional expression is satisfied:

$-0.03 < fL/f13 < 0.02$ where f13 denotes a focal length of the third lens in the first lens group.

11. The wide-angle lens according to claim 1, wherein the following conditional expression is satisfied:

$0.5 < fL/f2 < 0.65$ where f2 denotes a focal length of the second lens group.

12. The wide-angle lens according to claim 1, wherein an f-number of the wide-angle lens is 1.9 or less.

13. An imaging optical apparatus comprising:
the wide-angle lens according to claim 1; and
an imaging device for converting an optical image formed on a detecting surface into an electrical signal;
the wide-angle lens being disposed in such a manner that an optical image of an object is formed on the detecting surface of the imaging device.

14. A digital equipment added at least one function among taking a still picture and shooting movie of an object by installing the imaging optical apparatus according to claim 13.

* * * * *